United States Patent
Tanaka et al.

(10) Patent No.: US 11,066,586 B2
(45) Date of Patent: *Jul. 20, 2021

(54) CURABLE COMPOSITION, ADHESIVE SHEET, CURED PRODUCT, LAMINATE, METHOD FOR PRODUCING ADHESIVE SHEET, AND DEVICE

(71) Applicant: DAICEL CORPORATION, Osaka (JP)

(72) Inventors: Hiroki Tanaka, Himeji (JP); Naoko Tsuji, Himeji (JP); Akira Yamakawa, Himeji (JP)

(73) Assignee: DAICEL CORPORATION, Osaka (JP)

( * ) Notice: Subject to any disclaimer, the term of this patent is extended or adjusted under 35 U.S.C. 154(b) by 404 days.

This patent is subject to a terminal disclaimer.

(21) Appl. No.: 15/737,229

(22) PCT Filed: Jun. 13, 2016

(86) PCT No.: PCT/JP2016/067524
§ 371 (c)(1),
(2) Date: Dec. 15, 2017

(87) PCT Pub. No.: WO2016/204114
PCT Pub. Date: Dec. 22, 2016

(65) Prior Publication Data
US 2018/0171193 A1  Jun. 21, 2018

(30) Foreign Application Priority Data

Jun. 17, 2015 (JP) .............................. JP2015-122344
Jun. 17, 2015 (JP) .............................. JP2015-122347

(51) Int. Cl.
*C09J 183/06* (2006.01)
*C09J 183/12* (2006.01)
(Continued)

(52) U.S. Cl.
CPC ........... *C09J 183/12* (2013.01); *B32B 27/283* (2013.01); *C08L 83/04* (2013.01); *C08L 83/06* (2013.01);
(Continued)

(58) Field of Classification Search
None
See application file for complete search history.

(56) References Cited

U.S. PATENT DOCUMENTS

2010/0244201 A1  9/2010  Kitada
2013/0331476 A1  12/2013  Bae et al.
(Continued)

FOREIGN PATENT DOCUMENTS

CN  101787132 A  7/2010
JP  2006-131850 A  5/2006
(Continued)

OTHER PUBLICATIONS

International Search Report for PCT/JP2016/067524 (PCT/ISA/210) dated Aug. 9, 2016.
(Continued)

*Primary Examiner* — Frank D Ducheneaux
(74) *Attorney, Agent, or Firm* — Birch, Stewart, Kolasch & Birch, LLP

(57) ABSTRACT

Provided is a curable composition that can, when cured, form a cured product having adhesiveness and adhesion to an adherend at excellent levels. The curable composition contains a polyorganosilsesquioxane and one of (A) a compound represented by Formula (X); and (B) a polymerization stabilizer, where Formula (X) is expressed as follows:
(Continued)

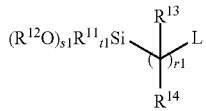

wherein r1 represents an integer from 4 to 20; L represents a group containing epoxy, oxetanyl or vinyl ether group; $R^{11}$ and $R^{12}$ each represent an optionally substituted hydrocarbon group; s1 represents an integer from 1 to 3; t1 represents an integer from 0 to 2, where s1 plus t1 equals 3; and $R^{13}$ and $R^{14}$ are selected from hydrogen and an optionally substituted hydrocarbon group. The polyorganosilsesquioxane has a number-average molecular weight of 1000 to 3000 and a molecular-weight dispersity of 1.0 to 3.0, includes a constitutional unit represented by Formula (1), has a ratio of a constitutional unit represented by Formula (I) to a constitutional unit represented by Formula (II) of 5 or more, and has a total proportion of the constitutional unit represented by Formula (1) and a constitutional unit represented by Formula (4) of 55 to 100 mole percent of all siloxane constitutional units. $[R^1SiO_{3/2}]$ (1), $[R^aSiO_{3/2}]$ (I), $[R^bSiO_{2/2}(OR^c)]$ (II), $[R^1SiO_{2/2}(OR^c)]$ (4), where $R^1$ represents an epoxy-containing group; $R^a$ and $R^b$ are each selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl.

20 Claims, 1 Drawing Sheet

(51) Int. Cl.
C09J 183/04 (2006.01)
C09J 163/00 (2006.01)
C08L 83/06 (2006.01)
C08L 83/04 (2006.01)
C08L 83/12 (2006.01)
C08G 77/04 (2006.01)
C08K 5/17 (2006.01)
C08K 5/34 (2006.01)
B32B 27/28 (2006.01)

(52) U.S. Cl.
CPC .............. C08L 83/12 (2013.01); C09J 163/00 (2013.01); C09J 183/04 (2013.01); C09J 183/06 (2013.01); C08G 77/045 (2013.01); C08K 5/17 (2013.01); C08K 5/34 (2013.01)

(56) References Cited

U.S. PATENT DOCUMENTS

2015/0159044 A1* 6/2015 Bae .................... C08G 59/3281
523/435
2015/0275043 A1* 10/2015 Kikuchi ............... C09D 183/04
428/220
2016/0297933 A1 10/2016 Kuwana et al.

FOREIGN PATENT DOCUMENTS

| JP | 2009-279840 A | 12/2009 |
|---|---|---|
| JP | 2010-226060 A | 10/2010 |
| JP | 2011-256326 A | 12/2011 |
| JP | 2012-87249 A | 5/2012 |
| JP | 2012-172014 A | 9/2012 |
| JP | 2014-169433 A | 9/2014 |
| SG | 186252 A1 | 1/2013 |
| WO | 2015/053397 A1 | 4/2015 |
| WO | 2015/087686 A1 | 6/2015 |

OTHER PUBLICATIONS

Written Opinion of the International Searching Authority for PCT/JP2016/067524 (PCT/ISA/237) dated Aug. 9, 2016.
Extended European Search Report, dated Jan. 3, 2019, for counterpart European Application No. 16811588.9.

* cited by examiner

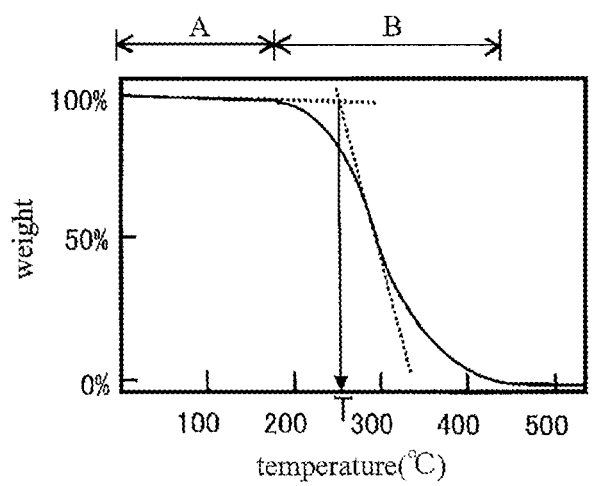

CURABLE COMPOSITION, ADHESIVE SHEET, CURED PRODUCT, LAMINATE, METHOD FOR PRODUCING ADHESIVE SHEET, AND DEVICE

CROSS-REFERENCE TO RELATED APPLICATIONS

This application is the U.S. National Phase of PCT/JP2016/067524, filed Jun. 13, 2016, and which claims priority under 35 U.S.C. § 119(a) to Application No. 2015-122344 filed in Japan on Jun. 17, 2015 and Application No. 2015-122347 filed in Japan on Jun. 17, 2015, the entire contents of all of which are expressly incorporated by reference into the present application.

TECHNICAL FIELD

The present invention relates to a curable composition, an adhesive sheet including an adhesive layer derived from the curable composition, a cured product of the curable composition, and a stack including the adhesive sheet and an adherend layer attached to the adhesive layer of the adhesive sheet. The present invention also relates to an adhesive sheet, a method for producing the adhesive sheet, and a stack including the adhesive sheet and an adherend layer attached to the adhesive layer of the adhesive sheet. The present invention also relates to a device including the stack. This application relates to Japanese Patent Application No. 2015-122344 and Japanese Patent Application No. 2015-122347 each filed Jun. 17, 2015 to Japan, the entire contents of each of which applications are incorporated herein by reference.

BACKGROUND ART

Some adhesives are used for stacking of semiconductors and for bonding of electronic components. Known examples of such adhesives include thermosetting adhesives containing any of benzocyclobutene (BCB), novolac epoxy resins, and polyorganosilsesquioxanes (see Patent Literature (PTL) 1 and PTL 2).

Stacked semiconductors (multilayer semiconductors) are exposed to high temperatures during their production processes. This requires high adhesion and high durability of adhesives to be used for the stacking of semiconductors. Disadvantageously, however, the thermosetting adhesives containing BCB require heating at high temperatures of about 200° C. to about 350° C. to be cured, and the exposure to such high temperatures may damage the adherends. Also disadvantageously, the thermosetting adhesives containing novolac epoxy resins, when subjected to high-temperature processes (for example, at 260° C. to 280° C.) such as lead-free solder reflow processes, are decomposed to outgas to thereby deteriorate in adhesion.

In contrast, the thermosetting adhesives containing polyorganosilsesquioxanes can be cured at lower temperatures as compared with the thermosetting adhesives containing BCB, can form cured products having excellent adhesiveness (bonding properties) and adhesion to a substrate, and can maintain adhesiveness even when subjected to high-temperature processes.

Exemplary known techniques to impart, to adhesives, excellent adhesion to semiconductors include a technique of applying a silane coupling agent to a semiconductor before the application of an adhesive so as to allow the adhesive to offer better adhesion; and a technique of incorporating a silane coupling agent into an adhesive.

CITATION LIST

Patent Literature

PTL 1: Japanese Unexamined Patent Application Publication (JP-A) No. 2009-279840
PTL 2: JP-A No. 2010-226060

SUMMARY OF INVENTION

Technical Problem

Such curable adhesives containing polyorganosilsesquioxanes, however, may undergo adhesion failure upon bonding of an adherend onto a bonding layer (adhesive layer), because the adhesives are partially cured during drying for the removal of solvents from the adhesives.

Accordingly, the present invention has an object to provide a curable composition that can, when cured, form a cured product having adhesiveness and adhesion to an adherend at excellent levels. The present invention has another object to provide a curable composition that can be cured at a low temperature to form a cured product having heat resistance and cracking resistance (or cold thermal shock resistance) at excellent levels.

The present invention has yet another object to provide a cured product that has adhesiveness and adhesion to an adherend at excellent levels. The present invention has still another object to provide a cured product that has heat resistance and cracking resistance (or cold thermal shock resistance) at excellent levels.

The present invention has another object to provide an adhesive sheet that has an adhesive layer derived from (formed from) the curable composition. The present invention has another object to provide a stack obtained by bonding an adherend or adherends with the curable composition, and a device including the stack.

The adhesive including a silane coupling agent offers better adhesion to semiconductors, but may suffer from cracks (cracking) upon application of thermal shocks such as temperature cycles (periodical repetition of heating and cooling).

The thermosetting adhesives containing polyorganosilsesquioxanes can maintain adhesiveness even when subjected to high-temperature processes. Disadvantageously, however, even the cured products of the thermosetting adhesives containing polyorganosilsesquioxanes are susceptible to cracking upon application of thermal shocks.

Accordingly, the present invention has another object to provide a curable composition that can form a cured product having cracking resistance (or cold thermal shock resistance), heat resistance, and adhesiveness and adhesion to an adherend at excellent levels.

The present invention has yet another object to provide a cured product that has cracking resistance (or cold thermal shock resistance), heat resistance, and adhesiveness and adhesion to an adherend at excellent levels. The present invention has still another object to provide an adhesive sheet that includes an adhesive layer derived from (formed from) the curable composition. The present invention has another object to provide an adhesive sheet and a method for producing the adhesive sheet, where the adhesive sheet has cracking resistance (or cold thermal shock resistance), heat resistance, and adhesiveness and adhesion to an adherend at excellent levels. In addition, the present invention has another object to provide a stack and a device including the stack, where the stack results from bonding an adherend or adherends with the adhesive sheet.

Solution to Problem

After intensive investigations to achieve the objects, the inventors of the present invention have found that a specific polysilsesquioxane and a specific epoxy-containing silane compound, when used in combination for the bonding of an adherend, gives an adhesive sheet that has cracking resistance (or cold thermal shock resistance), heat resistance, and adhesiveness and adhesion to an adherend at excellent levels. The inventors also have found that a curable composition containing the specific polysilsesquioxane and a polymerization stabilizer can form, when cured, a cured product that has adhesiveness and adhesion to an adherend at excellent levels. The present invention has been made on the basis of these findings.

Specifically, the present invention provides, in an embodiment, a curable composition containing a polyorganosilsesquioxane and one of (A) a compound represented by Formula (X) and (B) a polymerization stabilizer. Formula (X) is expressed as follows:

[Chem. 1]

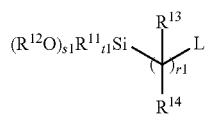
(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group. The polyorganosilsesquioxane has a number-average molecular weight of 1000 to 3000 and a molecular-weight dispersity (weight-average molecular weight to number-average molecular weight ratio) of 1.0 to 3.0. The polyorganosilsesquioxane includes a constitutional unit represented by Formula (1):

[Chem. 2]

$$[R^1SiO_{3/2}] \quad (1)$$

wherein $R^1$ is an epoxy-containing group. The polyorganosilsesquioxane has a ratio of a constitutional unit represented by Formula (I) to a constitutional unit represented by Formula (II) of 5 or more. Formulae (I) and (II) are expressed as follows:

[Chem. 3]

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl. The polyorganosilsesquioxane has a total proportion of the constitutional unit represented by Formula (1) and a constitutional unit represented by Formula (4) of 55 to 100 mole percent of all siloxane constitutional units. Formula (4) is expressed as follows:

[Chem. 5]

$$[R^1SiO_{2/2}(OR^c)] \quad (4)$$

wherein $R^1$ is as defined in Formula (1); and $R^c$ is as defined in Formula (II).

The polyorganosilsesquioxane preferably further includes a constitutional unit represented by Formula (2):

[Chem. 6]

$$[R^2SiO_{3/2}] \quad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

$R^2$ in the polyorganosilsesquioxane is preferably substituted or unsubstituted aryl.

$R^1$ in the polyorganosilsesquioxane is preferably at least one group selected from the class consisting of groups represented by Formula (1a), groups represented by Formula (1b), groups represented by Formula (1c), and groups represented by Formula (1d):

[Chem. 7]

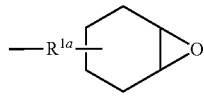
(1a)

wherein $R^{1a}$ represents linear or branched alkylene,

[Chem. 8]

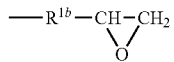
(1b)

wherein $R^{1b}$ represents linear or branched alkylene,

[Chem. 9]

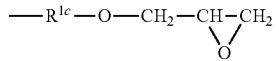
(1c)

wherein $R^{1c}$ represents linear or branched alkylene,

[Chem. 10]

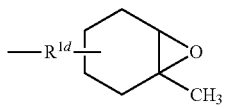
(1d)

wherein $R^{1d}$ represents linear or branched alkylene.

The compound (A) is preferably at least one epoxy-containing silane compound selected from the class consisting of compounds represented by Formula (X1) and compounds represented by Formula (X2):

[Chem. 11]

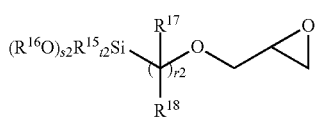
(X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group,

[Chem. 12]

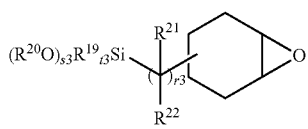
(X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

The curable composition preferably further contains a polymerization initiator.

The curable composition, when containing the polymerization stabilizer (B), preferably further contains a silane coupling agent.

The curable composition is preferably an adhesive composition.

The present invention provides, in another embodiment, an adhesive sheet including a substrate and an adhesive layer disposed on or over at least one side of the substrate, where the adhesive layer is derived from the curable composition.

The present invention provides, in yet another embodiment, a cured product of the curable composition.

The present invention provides, in still another embodiment, an adhesive sheet including a substrate, an anchor coat layer disposed on or over at least one side of the substrate, and an adhesive layer disposed on the anchor coat layer. The anchor coat layer contains a compound (A) represented by Formula (X):

[Chem. 1]

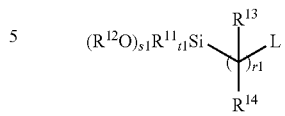
(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group. The adhesive layer is derived from a curable composition containing a polyorganosilsesquioxane. The polyorganosilsesquioxane has a number-average molecular weight of 1000 to 3000 and a molecular-weight dispersity (weight-average molecular weight to number-average molecular weight ratio) of 1.0 to 3.0. The polyorganosilsesquioxane includes a constitutional unit represented by Formula (1):

[Chem. 2]

$$[R^1SiO_{3/2}] \qquad (1)$$

wherein $R^1$ represents an epoxy-containing group. The polyorganosilsesquioxane has a ratio of a constitutional unit represented by Formula (I) to a constitutional unit represented by Formula (II) of 5 or more, where Formulae (I) and (II) are expressed as follows:

[Chem. 3]

$$[R^a SiO_{3/2}] \qquad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^b SiO_{2/2}(OR^c)] \qquad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl. The polyorganosilsesquioxane has a total proportion of the constitutional unit represented by Formula (1) and a constitutional unit represented by Formula (4) of 55 to 100 mole percent of all siloxane constitutional units. Formula (4) is expressed as follows:

[Chem. 5]

$$[R^1SiO_{2/2}(OR^c)] \qquad (4)$$

wherein $R^1$ is as defined in Formula (1); and $R^c$ is as defined in Formula (II).

The present invention provides, in still another embodiment, a stack (laminate) including the adhesive sheet and an adherend layer attached to (disposed on) the adhesive layer of the adhesive sheet.

The present invention provides, in another embodiment, a method for producing the adhesive sheet. The method includes the steps of a) forming an anchor coat layer on or over at least one side of a substrate, using a composition containing a compound (A) represented by Formula (X), and b) forming an adhesive layer on the anchor coat layer using a curable composition containing a polyorganosilsesquioxane. Formula (X) is expressed as follows:

[Chem. 1]

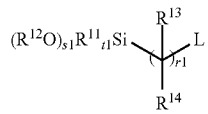
(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group. The polyorganosilsesquioxane has a number-average molecular weight of 1000 to 3000 and a molecular-weight dispersity (weight-average molecular weight to number-average molecular weight ratio) of 1.0 to 3.0. The polyorganosilsesquioxane includes a constitutional unit represented by Formula (1):

[Chem. 2]

$$[R^1SiO_{3/2}] \tag{1}$$

wherein $R^1$ represents an epoxy-containing group. The polyorganosilsesquioxane has a ratio of a constitutional unit represented by Formula (I) to a constitutional unit represented by Formula (II) of 5 or more. Formulae (I) and (II) are expressed as follows:

[Chem. 3]

$$[R^aSiO_{3/2}] \tag{II}$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^bSiO_{2/2}(OR^c)] \tag{II}$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen. The polyorganosilsesquioxane has a total proportion of the constitutional unit represented by Formula (1) and a constitutional unit represented by Formula (4) of 55 to 100 mole percent of all siloxane constitutional units. Formula (4) is expressed as follows:

[Chem. 5]

$$[R^1SiO_{2/2}(OR^c)] \tag{4}$$

wherein $R^1$ is as defined in Formula (1); and $R^c$ is as defined in Formula (II).

In addition and advantageously, the present invention provides a device including the stack.

Specifically, the present invention relates to the following:

(1) A curable composition containing a polyorganosilsesquioxane and one of (A) a compound represented by Formula (X) and (B) a polymerization stabilizer, Formula (X) expressed as follows:

[Chem. 1]

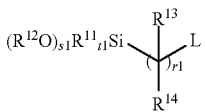
(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group, the polyorganosilsesquioxane having a number-average molecular weight of 1000 to 3000 and a molecular-weight dispersity (weight-average molecular weight to number-average molecular weight ratio) of 1.0 to 3.0, the polyorganosilsesquioxane including a constitutional unit represented by Formula (1):

[Chem. 2]

$$[R^aSiO_{3/2}] \tag{1}$$

wherein wherein $R^1$ represents an epoxy-containing group, the polyorganosilsesquioxane having a ratio of a constitutional unit represented by Formula (I) to a constitutional unit represented by Formula (II) of 5 or more, Formulae (I) and (II) expressed as follows:

[Chem. 3]

$$[R^aSiO_{3/2}] \tag{I}$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^bSiO_{2/2}(OR^c)] \tag{II}$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxane having a total proportion of the constitutional unit represented by Formula (1) and a constitutional unit represented by Formula (4) of 55 to 100 mole percent of all siloxane constitutional units, Formula (4) expressed as follows:

[Chem. 5]

$$[R^1SiO_{2/2}(OR^c)] \tag{4}$$

wherein $R^1$ is as defined in Formula (1); and $R^c$ is as defined in Formula (II).

(2) The curable composition according to (1), wherein the polyorganosilsesquioxane further includes a constitutional unit represented by Formula (2):

[Chem. 6]

$$[R^2SiO_{3/2}] \qquad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

(3) The curable composition according to (2), wherein $R^2$ is substituted or unsubstituted aryl.

(4) The curable composition according to any one of (1) to (3), wherein $R^1$ is at least one group selected from the class consisting of groups represented by Formula (1a), groups represented by Formula (1b), groups represented by Formula (1c), and groups represented by Formula (1d):

[Chem. 7]

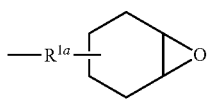

(1a)

wherein $R^{1a}$ represents linear or branched alkylene,

[Chem. 8]

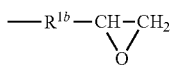

(1b)

wherein $R^{1b}$ represents linear or branched alkylene,

[Chem. 9]

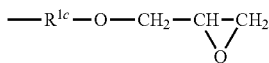

(1c)

wherein $R^{1c}$ represents linear or branched alkylene,

[Chem. 10]

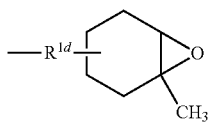

(1d)

wherein $R^{1d}$ represents linear or branched alkylene.

(5) The curable composition according to any one of (1) to (4), wherein the compound (A) is at least one epoxy-containing silane compound selected from the class consisting of compounds represented by Formula (X1) and compounds represented by Formula (X2):

[Chem. 11]

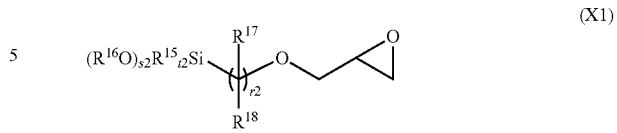

(X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group,

[Chem. 12]

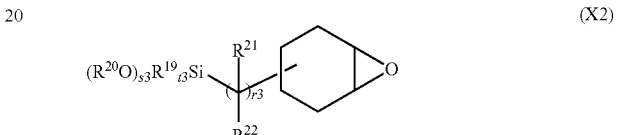

(X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

(6) The curable composition according to any one of (1) to (5), wherein the polyorganosilsesquioxane has a total proportion of the constitutional unit represented by Formula (1), the constitutional unit represented by Formula (2), the constitutional unit represented by Formula (4), and a constitutional unit represented by Formula (5) of 60 to 100 mole percent of the total amount (100 mole percent) of siloxane constitutional units in the polyorganosilsesquioxane, where Formula (5) is expressed as follows:

[Chem. 16]

$$[R^2SiO_{2/2}(OR^c)] \qquad (5)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl; and $R^c$ is selected from hydrogen and $C_1$-$C_4$ alkyl.

(7) The curable composition according to any one of (1) to (6), further containing a polymerization initiator.

(8) The curable composition according to any one of (1) to (7), wherein the curable composition contains the polymerization stabilizer (B) and further contains a silane coupling agent.

(9) The curable composition according to any one of (1) to (8), wherein the polyorganosilsesquioxane is present in a content (proportion) of from 70 weight percent to less than 100 weight percent of the total amount (100 weight percent) of the curable composition excluding solvent.

(10) The curable composition according to any one of (1) to (9), wherein the compound (A) is present in a content (proportion) of 0.01 to 10 parts by weight per 100 parts by weight of the polyorganosilsesquioxane.

(11) The curable composition according to any one of (1) to (10), wherein the polymerization stabilizer (B) is present in a content (proportion) of 0.005 part by weight or more per 100 parts by weight of the polyorganosilsesquioxane.

(12) The curable composition according to any one of (1) to (11), which is an adhesive composition.

(13) An adhesive sheet including a substrate and an adhesive layer disposed on or over at least one side of the substrate, the adhesive layer being derived from the curable composition according to (12).

(14) A cured product of the curable composition according to any one of (1) to (12).

(15) An adhesive sheet including a substrate, an anchor coat layer disposed on or over at least one side of the substrate, and an adhesive layer disposed on the anchor coat layer, the anchor coat layer containing a compound (A) represented by Formula (X):

[Chem. 1]

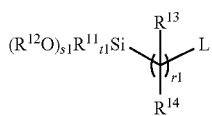
(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group, the adhesive layer being derived from a curable composition containing a polyorganosilsesquioxane, the polyorganosilsesquioxane having a number-average molecular weight of 1000 to 3000 and a molecular-weight dispersity (weight-average molecular weight to number-average molecular weight ratio) of 1.0 to 3.0, the polyorganosilsesquioxane including a constitutional unit represented by Formula (1):

[Chem. 2]

$$[R^1SiO_{3/2}] \quad (1)$$

wherein $R^1$ represents an epoxy-containing group, the polyorganosilsesquioxane having a ratio of a constitutional unit represented by Formula (I) to a constitutional unit represented by Formula (II) of 5 or more, Formulae (I) and (II) expressed as follows:

[Chem. 3]

$$[R^aSiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxane having a total proportion of the constitutional unit represented by Formula (1) and a constitutional unit represented by Formula (4) of 55 to 100 mole percent of all siloxane constitutional units, Formula (4) expressed as follows:

[Chem. 5]

$$[R^1SiO_{2/2}(OR^c)] \quad (4)$$

wherein $R^1$ is as defined in Formula (1); and $R^c$ is as defined in Formula (II).

(16) The adhesive sheet according to (15), wherein the polyorganosilsesquioxane further includes a constitutional unit represented by Formula (2):

[Chem. 6]

$$[R^2SiO_{3/2}] \quad (2)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

(17) The adhesive sheet according to (16), wherein $R^2$ is substituted or unsubstituted aryl.

(18) The adhesive sheet according to any one of (15) to (17), wherein $R^1$ is at least one group selected from the class consisting of groups represented by Formula (1a), groups represented by Formula (1b), groups represented by Formula (1c), and groups represented by Formula (1d):

[Chem. 7]

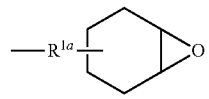
(1a)

wherein $R^{1a}$ represents linear or branched alkylene,

[Chem. 8]

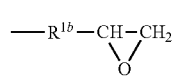
(1b)

wherein $R^{1b}$ represents linear or branched alkylene,

[Chem. 9]

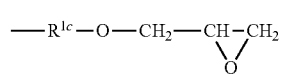
(1c)

wherein $R^{1c}$ represents linear or branched alkylene,

[Chem. 10]

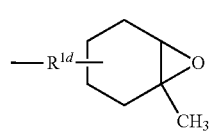
(1d)

wherein $R^{1d}$ represents linear or branched alkylene.

(19) The adhesive sheet according to any one of (15) to (18), wherein the polyorganosilsesquioxane has a total proportion (total amount) of the constitutional unit represented by Formula (1), the constitutional unit represented by Formula (2), the constitutional unit represented by Formula (4), and a constitutional unit represented by Formula (5) of 60 to 100 mole percent of the total amount (100 mole percent) of siloxane constitutional units in the polyorganosilsesquioxane, Formula (5) expressed as follows:

[Chem. 16]

$$[R^2SiO_{2/2}(OR^c)] \quad (5)$$

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl; and $R^c$ is selected from hydrogen and $C_1$-$C_4$ alkyl.

(20) The adhesive sheet according to any one of (15) to (19), wherein the curable composition further contains a polymerization initiator.

(21) The adhesive sheet according to any one of (15) to (20), wherein the polyorganosilsesquioxane in the curable composition is present in a content (proportion) of from 70 weight percent to less than 100 weight percent of the total amount (100 weight percent) of the curable composition excluding solvent.

(22) The adhesive sheet according to any one of (15) to (21), wherein the compound (A) in the anchor coat layer is present in a content (proportion) of 90 weight percent or more of the weight (100 weight percent) of the anchor coat layer.

(23) A stack including the adhesive sheet according to any one of (13) and (15) to (22); and an adherend layer attached to the adhesive layer of the adhesive sheet.

(24) A method for producing the adhesive sheet according to any one of (15) to (22), the method including the steps of a) forming an anchor coat layer on or over at least one side of a substrate, using a composition containing a compound (A) represented by Formula (X); and b) forming an adhesive layer on the anchor coat layer using a curable composition containing a polyorganosilsesquioxane, Formula (X) expressed as follows:

[Chem. 1]

(X)

wherein r1 represents an integer from 4 to 20; L represents a group containing at least one group selected from the class consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group, the polyorganosilsesquioxane having a number-average molecular weight of 1000 to 3000 and a molecular-weight dispersity (weight-average molecular weight to number-average molecular weight ratio) of 1.0 to 3.0, the polyorganosilsesquioxane including a constitutional unit represented by Formula (1):

[Chem. 2]

$$[R^1SiO_{3/2}] \quad (1)$$

wherein $R^1$ represents an epoxy-containing group, the polyorganosilsesquioxane having a ratio of a constitutional unit represented by Formula (I) to a constitutional unit represented by Formula (II) of 5 or more, Formulae (I) and (II) expressed as follows:

[Chem. 3]

$$[R^aSiO_{3/2}] \quad (I)$$

wherein wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^bSiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and $R^c$ is selected from hydrogen and $C_1$-$C_4$ alkyl, the polyorganosilsesquioxane having a total proportion of the constitutional unit represented by Formula (1) and a constitutional unit represented by Formula (4) of 55 to 100 mole percent of all siloxane constitutional units, Formula (4) expressed as follows:

[Chem. 5]

$$[R^1SiO_{2/2}(OR^c)] \quad (4)$$

wherein $R^1$ is as defined in Formula (1); and $R^c$ is as defined in Formula (II).

(25) A device including the stack according to (23).

Advantageous Effects of Invention

The curable compositions according to the present invention, as having the configurations, can form cured products having adhesiveness and adhesion to an adherend at excellent levels. Of the curable compositions, a curable composition according to the present invention containing the compound (A) represented by Formula (X) (after-mentioned first curable composition according to the present invention) can form a cured product that has cracking resistance, heat resistance, and adhesiveness and adhesion to an adherend at excellent levels; and a curable composition according to the present invention containing the polymerization stabilizer (B) (after-mentioned second curable composition according to the present invention) can form a cured product that has adhesiveness and adhesion to an adherend at excellent levels (further, the curable composition can be cured at a low temperature to give a cured product that has heat resistance and cracking resistance at excellent levels). The curable compositions according to the present invention are therefore advantageously usable as adhesive compositions (adhesives). The curable compositions, when used, can give adhesive sheets and stacks. The adhesive sheets according to the present invention, as having the configurations, have heat resistance, cracking resistance, and adhesiveness and adhesion to an adherend at excellent levels.

The resulting stacks, such as three-dimensional stacked semiconductor chips, obtained using any of the curable compositions and adhesive sheets according to the present invention are more highly integrated and less consume power as compared with conventional semiconductors and can provide electronic devices that have higher packaging densities and still have high performance. In particular, cracking and/or separation (or delamination) of the bonding layers in the stacks may cause failure of wiring or interconnection in the stacks during their production, or in products such as semiconductor chips and wafers produced using the stacks. This results in failure or breakdown of the stacks or devices including the stacks. Under these circumstances, adhesives having adhesiveness and adhesion to an adherend, heat resistance, and cracking resistance at high levels are very important as materials to constitute the stacks. The curable compositions according to the present invention can therefore give stacks having high reliability.

BRIEF DESCRIPTION OF DRAWING

FIG. 1 is a graph illustrating how to evaluate the heat resistance of a cured product (a graph schematically illustrating the result of thermogravimetry).

DESCRIPTION OF EMBODIMENTS

Adhesive sheets according to the present invention employ a polyorganosilsesquioxane and one of (A) a compound represented by Formula (X) and (B) a polymerization stabilizer. The compound (A) represented by Formula (X) is hereinafter also simply referred to as a "compound (A)". Non-limiting examples of such adhesive sheets include (1) adhesive sheets each including a substrate and an adhesive layer disposed on or over at least one side of the substrate, where the adhesive layer is derived from (formed from) any of the curable compositions according to the present invention; and (2) adhesive sheets each including a substrate, an anchor coat layer, and an adhesive layer, where the anchor coat layer is disposed on or over at least one side of the substrate and contains the compound (A), and the adhesive layer is disposed on (on the surface of) the anchor coat layer and is derived from (formed from) a curable composition containing the polyorganosilsesquioxane. Formula (X) is expressed as follows:

[Chem. 1]

(X)

Curable compositions according to the present invention are curable compositions each containing the polyorganosilsesquioxane and one of the compound (A) and the polymerization stabilizer (B). A curable composition according to the present invention containing the compound (A) is also referred to as a "first curable composition according to the present invention". A curable composition according to the present invention containing the polymerization stabilizer (B) is also referred to as a "second curable composition according to the present invention". As used herein, the term "curable composition(s) according to the present invention" is the generic terms for the first curable composition according to the present invention and the second curable composition according to the present invention. The curable composition according to the present invention contains at least one of the compound (A) and the polymerization stabilizer (B) and may contain both of them.

Polyorganosilsesquioxane

The polyorganosilsesquioxane (silsesquioxane) includes a constitutional unit represented by Formula (1). The polyorganosilsesquioxane has a ratio of a constitutional unit represented by Formula (I) to a constitutional unit represented by Formula (II) of 5 or more. The constitutional unit represented by Formula (I) is also referred to as a "T3 species". The constitutional unit represented by Formula (II) is also referred to as a "T2 species". The ratio mentioned above is also referred to as a "T3 to T2 ratio". The polyorganosilsesquioxane has a total proportion (total amount) of the constitutional unit represented by Formula (1) and a constitutional unit represented by after-mentioned Formula (4) of 55 to 100 mole percent of the total amount (100 mole percent) of siloxane constitutional units. The polyorganosilsesquioxane has a number-average molecular weight of 1000 to 3000. The polyorganosilsesquioxane has a molecular-weight dispersity (weight-average molecular weight to number-average molecular weight ratio) of 1.0 to 3.0. In the description, this polyorganosilsesquioxane is also referred to as a "polyorganosilsesquioxane for use in the present invention". Formulae (1), (I), and (II) are expressed as follows:

[Chem. 2]

$[R^1SiO_{3/2}]$ (1)

[Chem. 3]

$[R^aSiO_{3/2}]$ (I)

[Chem. 4]

$[R^bSiO_{2/2}(OR^c)]$ (II)

The constitutional unit represented by Formula (1) is a silsesquioxane constitutional unit (a so-called T unit) generally represented by the formula $[RSiO_{3/2}]$. R in the formula is selected from hydrogen and a monovalent organic group; hereinafter the same. The constitutional unit represented by Formula (1) results from hydrolysis and condensation of a corresponding hydrolyzable trifunctional silane compound. Specifically, this corresponding compound is exemplified typically by compounds represented by after-mentioned Formula (a).

In Formula (1), $R^1$ represents an epoxy-containing group (monovalent group). Specifically, the polyorganosilsesquioxane for use in the present invention is a cationically curable compound (cationically polymerizable compound) containing an epoxy group in a molecule. Non-limiting examples of the epoxy-containing group include known or common oxirane-ring-containing groups. In particular, $R^1$ is preferably selected from groups represented by Formula (1a), groups represented by Formula (1b), groups represented by Formula (1c), and groups represented by Formula (1d); is more preferably selected from groups represented by Formula (1a) and groups represented by Formula (1c); and furthermore preferably selected from groups represented by Formula (1a). These are preferred from the viewpoints of curability of the curable composition and the heat resistance of the cured product. Formulae (1a), (1b), (1c), and (1d) are expressed as follows:

[Chem. 7]

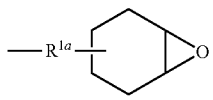
(1a)

[Chem. 8]

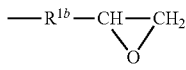
(1b)

[Chem. 9]

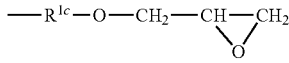
(1c)

[Chem. 10]

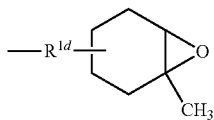
(1d)

In Formula (1a), $R^{1a}$ represents linear or branched alkylene. Non-limiting examples of the linear or branched alkylene include $C_1$-$C_{10}$ linear or branched alkylenes such as methylene, methylmethylene, dimethylmethylene, ethylene, propylene, trimethylene, tetramethylene, pentamethylene, hexamethylene, and decamethylene. In particular, $R^{1a}$ is preferably selected from $C_1$-$C_4$ linear (straight-chain) alkylenes and $C_3$ or $C_4$ branched (branched-chain) alkylenes; more preferably selected from ethylene, trimethylene, and propylene; and furthermore preferably selected from ethylene and trimethylene. These are preferred from the viewpoint of curability of the curable composition.

In Formula (1b), $R^{1b}$ represents linear or branched alkylene and is exemplified typically by groups similar to those as $R^{1a}$. In particular, $R^{1b}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoint of curability of the curable composition.

In Formula (1c), $R^{1c}$ represents linear or branched alkylene and is exemplified typically by groups similar to those as $R^{1a}$. In particular, $R^{1c}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoint of curability of the curable composition.

In Formula (1d), $R^{1d}$ represents linear or branched alkylene and is exemplified typically by groups similar to those as $R^{1a}$. In particular, $R^{1d}$ is preferably selected from $C_1$-$C_4$ linear alkylenes and $C_3$ or $C_4$ branched alkylenes; more preferably selected from ethylene, trimethylene, and propylene; and furthermore preferably selected from ethylene and trimethylene. These are preferred from the viewpoint of curability of the curable composition.

In particular, $R^1$ in Formula (1) is preferably selected from groups represented by Formula (1a) in which $R^{1a}$ is ethylene. $R^1$ is particularly preferably a 2-(3,4-epoxycyclohexyl) ethyl group.

The polyorganosilsesquioxane for use in the present invention may include each of different constitutional units represented by Formula (1) alone or in combination.

The polyorganosilsesquioxane for use in the present invention may further include a constitutional unit represented by Formula (2) as a silsesquioxane constitutional unit [$RSiO_{3/2}$], in addition to the constitutional unit(s) represented by Formula (1). Formula (2) is expressed as follows:

[Chem. 6]

$$[R^2SiO_{3/2}] \qquad (2)$$

The constitutional unit represented by Formula (2) is a silsesquioxane constitutional unit (a T unit) generally represented by the formula [$RSiO_{3/2}$]. Specifically, the constitutional unit represented by Formula (2) results from hydrolysis and condensation of a corresponding hydrolyzable trifunctional silane compound. Specifically, the compound just mentioned above is exemplified typically by compounds represented by after-mentioned Formula (b).

In Formula (2), $R^2$ is selected from substituted or unsubstituted aryl, substituted or unsubstituted aralkyl, substituted or unsubstituted cycloalkyl, substituted or unsubstituted alkyl, and substituted or unsubstituted alkenyl. Non-limiting examples of the aryl include phenyl, tolyl, and naphthyl. Non-limiting examples of the aralkyl include benzyl and phenethyl. Non-limiting examples of the cycloalkyl include cyclobutyl, cyclopentyl, and cyclohexyl. Non-limiting examples of the alkyl include linear or branched alkyls such as methyl, ethyl, propyl, n-butyl, isopropyl, isobutyl, s-butyl, t-butyl, and isopentyl. Non-limiting examples of the alkenyl include linear or branched alkenyls such as vinyl, allyl, and isopropenyl.

Non-limiting examples of the substituted aryl, substituted aralkyl, substituted cycloalkyl, substituted alkyl, and substituted alkenyl include groups resulting from replacing part or all of hydrogen atoms or of the principal chain skeleton respectively of the aryls, aralkyls, cycloalkyls, alkyls and alkenyls, with at least one selected from the class consisting of ether groups, ester groups, carbonyls, siloxane groups, halogens (such as fluorine), acryls, methacryls, mercaptos, aminos, and hydroxys.

In particular, $R^2$ is preferably selected from substituted or unsubstituted aryls, substituted or unsubstituted alkyls, and substituted or unsubstituted alkenyls; is more preferably selected from substituted or unsubstituted aryls; and is furthermore preferably phenyl.

Proportions of these silsesquioxane constitutional units (the constitutional unit represented by Formula (1) and the constitutional unit represented by Formula (2)) in the polyorganosilsesquioxane for use in the present invention may be adjusted as appropriate by the formula (proportions) of starting materials (hydrolyzable trifunctional silanes) to form the constitutional units.

In addition to the constitutional unit represented by Formula (1), and optionally in addition to the constitutional unit represented by Formula (2), the polyorganosilsesquioxane for use in the present invention may further include at least one siloxane constitutional unit selected from the class consisting of silsesquioxane constitutional units [$RSiO_{3/2}$] other than the constitutional units represented by Formula (1) and the constitutional units represented by Formula (2); constitutional units represented by the formula [$R_3SiO_{1/2}$] (so-called M units); constitutional units represented by the formula [$R_2SiO_{2/2}$] (so-called D units); and constitutional units represented by the formula [$SiO_{4/2}$] (so-called Q units). A non-limiting example of the silsesquioxane constitutional units other than the constitutional units represented by Formula (1) and the constitutional units represented by Formula (2) is a constitutional unit represented by Formula (3):

[Chem. 13]

$$[HSiO_{3/2}] \quad (3)$$

The polyorganosilsesquioxane for use in the present invention has a T3 to T2 ratio of the constitutional unit represented by Formula (I) (T3 species) to the constitutional unit represented by Formula (II) (T2 species) of 5 or more, as described above. The polyorganosilsesquioxane has a T3 to T2 ratio of preferably 5 to 18, more preferably 6 to 16, and furthermore preferably 7 to 14. The polyorganosilsesquioxane, as having a T3 to T2 ratio of 5 or more, allows the cured product to have significantly better adhesiveness.

When described in more detail, the constitutional unit represented by Formula (I) is represented by Formula (I'); and the constitutional unit represented by Formula (II) is represented by Formula (II'). In the structure represented by Formula (I'), the three oxygen atoms, which are bonded to the specified silicon atom, are bonded respectively to three other silicon atoms (silicon atoms not shown in Formula (I')). In the structure represented by Formula (II'), the two oxygen atoms, which are positioned above and below the specified silicon atom, are bonded respectively to two other silicon atoms (silicon atoms not shown in Formula (II')). Specifically, the T3 species and the T2 species are both constitutional units (T units) resulting from hydrolysis and condensation of corresponding hydrolyzable trifunctional silane compounds. Formulae (I') and (II') are expressed as follows:

[Chem. 14]

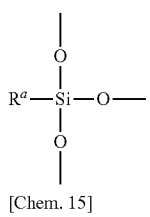

(I')

[Chem. 15]

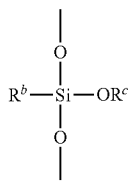

(II')

Each of $R^a$ in Formula (I) (also $R^a$ in Formula (I')) and $R^b$ in Formula (II) (also $R^b$ in Formula (II')) is independently selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen. Specific examples of $R^a$ and $R^b$ are as with $R^1$ in Formula (1) and $R^2$ in Formula (2). $R^a$ in Formula (I) and $R^b$ in Formula (II) are derived from groups bonded to the silicon atom in hydrolyzable trifunctional silane compounds used as starting materials to form the polyorganosilsesquioxane for use in the present invention, where the groups bonded to the silicon atom are groups other than alkoxys and halogens;

and are exemplified typically by $R^1$, $R^2$, and hydrogen in Formulae (a), (b), and (c) below.

$R^c$ in Formula (II) (also $R^c$ in Formula (II')) is selected from hydrogen and $C_1$-$C_4$ alkyl. Non-limiting examples of the $C_1$-$C_4$ alkyl include $C_1$-$C_4$ linear or branched alkyls such as methyl, ethyl, propyl, isopropyl, butyl, and isobutyl. The alkyl as $R^c$ in Formula (II) is generally derived from an alkyl moiety that constitutes an alkoxy group in a hydrolyzable silane compound used as a starting material to form the polyorganosilsesquioxane for use in the present invention. Non-limiting examples of the alkoxy group include alkoxy groups as $X^1$ to $X^3$ mentioned below.

The T3 to T2 ratio in the polyorganosilsesquioxane for use in the present invention may be determined typically by $^{29}$Si-NMR spectrum measurement. In the $^{29}$Si-NMR spectrum, the silicon atom in the constitutional unit represented by Formula (I) (T3 species) and the silicon atom in the constitutional unit represented by Formula (II) (T2 species) give signals (peaks) at different positions due to chemical shift. These peaks are independently integrated, and the ratio between them is calculated to determine the T3 to T2 ratio. Specifically, for example, in the case that the polyorganosilsesquioxane for use in the present invention includes a constitutional unit represented by Formula (1) in which $R^1$ is a 2-(3,4-epoxycyclohexyl)ethyl group, the silicon atom in the structure represented by Formula (I) (T3 species) gives a signal appearing at −64 to −70 ppm, whereas the silicon atom in the structure represented by Formula (II) (T2 species) gives a signal appearing at −54 to −60 ppm. The T3 to T2 ratio in this case may be determined by calculating the ratio of the integrated signal at −64 to −70 ppm (assigned to the T3 species) to the integrated signal at −54 to −60 ppm (assigned to the T2 species).

The $^{29}$Si-NMR spectrum of the polyorganosilsesquioxane for use in the present invention may be measured typically with an apparatus under conditions as follows:

Measuring apparatus: JNM-ECA 500 NMR (trade name, supplied by JEOL Ltd.)
Solvent: deuterated chloroform
Number of scans: 1800
Measurement temperature: 25° C.

The polyorganosilsesquioxane for use in the present invention has a T3 to T2 ratio of 5 or more. This means that the T2 species is present in a proportion at a certain level or higher relative to the T3 species in the polyorganosilsesquioxane for use in the present invention. Non-limiting examples of such T2 species include constitutional units represented by Formula (4), constitutional units represented by Formula (5), and constitutional units represented by Formula (6). $R^1$ in Formula (4) and $R^2$ in Formula (5) are respectively as with $R^1$ in Formula (1) and $R^2$ in Formula (2). $R^c$ in Formulae (4) to (6) is as with $R^c$ in Formula (II) and is selected from hydrogen and $C_1$-$C_4$ alkyl. Formulae (4) to (6) are expressed as follows:

[Chem. 5]

$$[R^1SiO_{2/2}(OR^c)] \quad (4)$$

[Chem. 16]

$$[R^2SiO_{2/2}(OR^c)] \quad (5)$$

[Chem. 17]

$$[HSiO_{2/2}(OR^c)] \quad (6)$$

In general, a complete-cage (fully condensed cage) silsesquioxane is a polyorganosilsesquioxane including T3 species alone and is devoid of T2 species in a molecule. Accordingly, it is suggested that the polyorganosilsesquioxane for use in the present invention has a partial cage (incomplete cage) silsesquioxane structure when the polyorganosilsesquioxane has a T3 to T2 ratio of 5 or more, has a number-average molecular weight of 1000 to 3000 and a molecular-weight dispersity of 1.0 to 3.0, and gives one intrinsic absorption peak at around 1100 cm$^{-1}$ in an FT-IR spectrum, as described below.

When the polyorganosilsesquioxane for use in the present invention does not give intrinsic absorption peaks individually at around 1050 cm$^{-1}$ and at around 1150 cm$^{-1}$, but gives one intrinsic absorption peak at around 1100 cm$^{-1}$ in the FT-IR spectrum, it is verified that the polyorganosilsesquioxane has a cage (partial cage) silsesquioxane structure (reference: R. H. Raney, M. Itoh, A. Sakakibara, and T. Suzuki, Chem. Rev. 95, 1409 (1995)). In contrast, a polyorganosilsesquioxane that gives intrinsic absorption peaks both at around 1050 cm$^{-1}$ and at around 1150 cm$^{-1}$ in an FT-IR spectrum is generally identified as having a ladder silsesquioxane structure. The FT-IR spectrum of the polyorganosilsesquioxane for use in the present invention may be measured typically with an apparatus under conditions as follows:

Measuring apparatus: FT-720 (trade name, supplied by HORIBA, Ltd.)
Measurement method: through transmission
Resolution: 4 cm$^{-1}$
Measurement wavenumber range: 400 to 4000 cm$^{-1}$
Number of scans: 16

The proportion (total proportion; total amount) of the constitutional unit represented by Formula (1) and the constitutional unit represented by Formula (4) to the total amount (100 mole percent) of siloxane constitutional units (the total amount of all siloxane constitutional units: M units, D units, T units, and Q units) in the polyorganosilsesquioxane for use in the present invention, is 55 to 100 mole percent as described above, and is preferably 65 to 100 mole percent, and furthermore preferably 80 to 99 mole percent. The polyorganosilsesquioxane, as having a total proportion of these units of 55 mole percent or more, allows the curable composition to have better curability and allows the cured product to have significantly higher adhesiveness. The proportions of the siloxane constitutional units in the polyorganosilsesquioxane for use in the present invention may be calculated typically by the composition (proportions) of starting materials and/or by NMR spectrum measurement.

The total proportion (total amount) of the constitutional unit represented by Formula (2) and the constitutional unit represented by Formula (5) to the total amount (100 mole percent) of siloxane constitutional units (the total amount of all siloxane constitutional units: M units, D units, T units, and Q units) in the polyorganosilsesquioxane for use in the present invention, is not limited, but preferably 0 to 70 mole percent, more preferably 0 to 60 mole percent, furthermore preferably 0 to 40 mole percent, and particularly preferably 1 to 15 mole percent. The polyorganosilsesquioxane, when having a proportion of these constitutional units of 70 mole percent or less, can have relatively larger proportions of the constitutional unit represented by Formula (1) and the constitutional unit represented by Formula (4), tends to allow the curable composition to have better curability, and tends to allow the cured product to have still higher adhesiveness.

The total proportion (total amount) of the constitutional unit represented by Formula (1), the constitutional unit represented by Formula (2), the constitutional unit represented by Formula (4), and the constitutional unit represented by Formula (5) to the total amount (100 mole percent) of siloxane constitutional units (the total amount of all siloxane constitutional units: M units, D units, T units, and Q units) in the polyorganosilsesquioxane for use in the present invention, is not limited, but preferably 60 to 100 mole percent, more preferably 70 to 100 mole percent, and furthermore preferably 80 to 100 mole percent. The polyorganosilsesquioxane, when having a total proportion of these constitutional units of 60 mole percent or more, tends to allow the cured product to have still higher adhesiveness.

The polyorganosilsesquioxane for use in the present invention has a number-average molecular weight (Mn) of 1000 to 3000 as described above, preferably 1000 to 2800, and more preferably 1100 to 2600, where the number-average molecular weight is determined by gel permeation chromatography and calibrated with a polystyrene standard. The polyorganosilsesquioxane, as having a number-average molecular weight of 1000 or more, allows the cured product to have heat resistance and adhesiveness at still better levels. In contrast, the polyorganosilsesquioxane, as having a number-average molecular weight of 3000 or less, has better compatibility with other components in the curable composition and allows the cured product to have still better heat resistance.

The polyorganosilsesquioxane for use in the present invention has a molecular-weight dispersity (Mw/Mn) of 1.0 to 3.0 as described above, preferably 1.1 to 2.0, more preferably 1.2 to 1.9, and furthermore preferably 1.45 to 1.80, where the molecular-weight dispersity is determined by gel permeation chromatography and calibrated with a polystyrene standard. The polyorganosilsesquioxane, as having a molecular-weight dispersity of 3.0 or less, allows the cured product to have still higher adhesiveness. In contrast, the polyorganosilsesquioxane, as having a molecular-weight dispersity of 1.0 or more (in particular, 1.1 or more), tends to easily become liquid and to have better handleability.

The number-average molecular weight and the molecular-weight dispersity of the polyorganosilsesquioxane for use in the present invention may be measured with an apparatus under conditions as follows:

Measuring apparatuses: Alliance HPLC System 2695 (trade name, supplied by Waters Corporation), Refractive Index Detector 2414 (trade name, supplied by Waters Corporation)
Columns: two Tskgel GMH$_{HR}$-M columns (supplied by Tosoh Corporation)
Guard column: Tskgel guard column H$_{HR}$L (supplied by Tosoh Corporation)
Column oven: COLUMN HEATER U-620 (supplied by Sugai)
Solvent: THF
Measurement condition: 40° C.
Molecular weights: calibrated with a polystyrene standard The polyorganosilsesquioxane for use in the present invention may have a 5% weight loss temperature (T$_{d5}$) in an air atmosphere of not limited, but preferably 330° C. or higher (e.g., 330° C. to 450° C.), more preferably 340° C. or higher, and furthermore preferably 350° C. or higher. The polyorganosilsesquioxane, when having a 5% weight loss temperature of 330° C. or higher, tends to allow the cured product to have still better heat resistance. In particular, the polyorganosilsesquioxane for use in the present invention may be controlled to have a 5% weight loss temperature of 330° C. or higher when the curable composition has a T3 to T2 ratio of 5 or more, a number-average molecular weight of 1000 to 3000, and a molecular-weight dispersity of 1.0 to 3.0 and gives one intrinsic peak at around 1100 cm$^{-1}$ in the FT-IR spectrum. The 5% weight loss temperature is a temperature at the time point when a sample heated at a predetermined rate of temperature rise loses 5% of its initial weight (weight before heating). The 5% weight loss temperature serves as an index for heat resistance. The 5% weight loss temperature may be measured by thermogravimetry (TGA) in an air atmosphere at a rate of temperature rise of 5° C./min.

The polyorganosilsesquioxane for use in the present invention may be produced by any of known or common methods for producing polysiloxanes without limitation, but may be produced typically by a method in which one hydrolyzable silane compound, or two or more different hydrolyzable silane compounds are hydrolyzed and condensed (hydrolytically condensed). However, as an essential hydrolyzable silane compound, a hydrolyzable trifunctional silane compound (compound represented by Formula (a)) is used to form the constitutional unit represented by Formula (1).

More specifically, the polyorganosilsesquioxane for use in the present invention may be produced typically by a method of hydrolyzing and condensing the compound represented by Formula (a), where necessary in combination with at least one of a compound represented by Formula (b) and a compound represented by Formula (c). These compounds are hydrolyzable silane compounds to form silsesquioxane constitutional units (T units) in the polyorganosilsesquioxane for use in the present invention. Formulae (a), (b), and (c) are expressed as follows:

[Chem. 18]

$$R^1Si(X^1)_3 \quad (a)$$

[Chem. 19]

$$R^2Si(X^2)_3 \quad (b)$$

[Chem. 20]

$$HSi(X^3)_3 \quad (c)$$

The compound represented by Formula (a) is a compound to form the constitutional unit represented by Formula (1) in the polyorganosilsesquioxane for use in the present invention. R$^1$ in Formula (a) represents an epoxy-containing group, as with R$^1$ in Formula (1). Specifically, R$^1$ in Formula (a) is preferably selected from groups represented by Formula (1a), groups represented by Formula (1b), groups represented by Formula (1c), and groups represented by Formula (1d); is more preferably selected from groups represented by Formula (1a) and groups represented by Formula (1c); is furthermore preferably selected from groups represented by Formula (1a); is particularly preferably selected from groups represented by Formula (1a) in which R$^{1a}$ is ethylene; and is especially preferably a 2-(3, 4-epoxycyclohexyl) ethyl group.

X$^1$ in Formula (a) is, independently in each occurrence, selected from alkoxy and halogen. Non-limiting examples of the alkoxy as X$^1$ include C$_1$-C$_4$ alkoxys such as methoxy, ethoxy, propoxy, isopropyloxy, butoxy, and isobutyloxy. Non-limiting examples of the halogen as X$^1$ include fluorine, chlorine, bromine, and iodine. In particular, each occurrence of X$^1$ is preferably selected from alkoxys and more preferably selected from methoxy and ethoxy. The three occurrences of X$^1$ may be identical to or different from one another.

The compound represented by Formula (b) is a compound to form the constitutional unit represented by Formula (2) in the polyorganosilsesquioxane for use in the present invention. R$^2$ in Formula (b) is selected from substituted or unsubstituted aryl, substituted or unsubstituted aralkyl, substituted or unsubstituted cycloalkyl, substituted or unsubstituted alkyl, and substituted or unsubstituted alkenyl, as with R$^2$ in Formula (2). Specifically, R$^2$ in Formula (b) is preferably selected from substituted or unsubstituted aryls, substituted or unsubstituted alkyls, and substituted or unsubstituted alkenyls; is more preferably selected from substituted or unsubstituted aryls; and is furthermore preferably phenyl.

X$^2$ in Formula (b) is, independently in each occurrence, selected from alkoxy and halogen. Specific examples of X$^2$ are as with X$^1$. In particular, each occurrence of X$^2$ is preferably selected from alkoxys and is more preferably selected from methoxy and ethoxy. The three occurrences of X$^2$ may be identical to or different from one another.

The compound represented by Formula (c) is a compound to form the constitutional unit represented by Formula (3) in the polyorganosilsesquioxane for use in the present invention. X$^3$ in Formula (c) is, independently in each occurrence, selected from alkoxy and halogen. Specific examples of X$^3$ are as with X$^1$. In particular, X$^3$ is preferably selected from alkoxys and is more preferably selected from methoxy and ethoxy. The three occurrences of X$^3$ may be identical to or different from one another.

The hydrolyzable silane compound(s) for use herein may further include one or more hydrolyzable silane compounds other than the compounds represented by Formulae (a), (b), and (c). Non-limiting examples of such other hydrolyzable silane compounds include hydrolyzable trifunctional silane compounds other than the compounds represented by Formulae (a), (b), and (c); hydrolyzable monofunctional silane compounds to form M units; hydrolyzable bifunctional silane compounds to form D units; and hydrolyzable tetrafunctional silane compounds to form Q units.

The amounts and composition (proportions) of the hydrolyzable silane compounds may be adjusted as appropriate according to the desired structure of the polyorganosilsesquioxane for use in the present invention. For example, the amount of the compound represented by Formula (a) is not limited, but is preferably 55 to 100 mole percent, more preferably 65 to 100 mole percent, and furthermore preferably 80 to 99 mole percent, of the total amount (100 mole percent) of the hydrolyzable silane compound(s) to be used.

The amount of the compound represented by Formula (b) is not limited, but is preferably 0 to 70 mole percent, more preferably 0 to 60 mole percent, furthermore preferably 0 to 40 mole percent, and particularly preferably 1 to 15 mole percent, of the total amount (100 mole percent) of the hydrolyzable silane compound(s) to be used.

The total proportion (proportion of the total amount) of the compound represented by Formula (a) and the compound represented by Formula (b) is not limited, but preferably 60 to 100 mole percent, more preferably 70 to 100 mole percent, and furthermore preferably 80 to 100 mole percent, of the total amount (100 mole percent) of all hydrolyzable silane compound(s) to be used.

When two or more different hydrolyzable silane compounds are used in combination, the reactions of hydrolysis and condensation of these hydrolyzable silane compounds may be performed simultaneously or sequentially. The reactions, when performed sequentially, may be performed in any sequence without limitation.

The hydrolysis and condensation of the hydrolyzable silane compound may be performed in the presence of, or in the absence of, a solvent. In particular, the hydrolysis and condensation is preferably performed in the presence of a solvent. Non-limiting examples of the solvent include aromatic hydrocarbons such as benzene, toluene, xylenes, and ethylbenzene; ethers such as diethyl ether, dimethoxyethane, tetrahydrofuran, and dioxane; ketones such as acetone, methyl ethyl ketone, and methyl isobutyl ketone; esters such as methyl acetate, ethyl acetate, isopropyl acetate, and butyl acetate; amides such as N,N-dimethylformamide and N,N-dimethylacetamide; nitriles such as acetonitrile, propionitrile, and benzonitrile; and alcohols such as methanol, ethanol, isopropyl alcohol, and butanol. In particular, the solvent is preferably selected from ketones and ethers. Each of different solvents may be used alone or in combination.

The amount of the solvent is not limited and may be adjusted as appropriate according typically to the desired reaction time, within the range of 0 to 2000 parts by weight per 100 parts by weight of the total amount of the hydrolyzable silane compound(s).

The hydrolysis and condensation of the hydrolyzable silane compound(s) is preferably allowed to proceed in the presence of a catalyst and water. The catalyst may be either of an acid catalyst and an alkaline catalyst. Non-limiting examples of the acid catalyst include mineral acids such as hydrochloric acid, sulfuric acid, nitric acid, phosphoric acid, and boric acid; phosphoric esters; carboxylic acids such as acetic acid, formic acid, and trifluoroacetic acid; sulfonic acids such as methanesulfonic acid, trifluoromethanesulfonic acid, and p-toluenesulfonic acid; solid acids such as activated clay; and Lewis acids such as iron chloride. Non-limiting examples of the alkaline catalyst include alkali metal hydroxides such as lithium hydroxide, sodium hydroxide, potassium hydroxide, and cesium hydroxide; alkaline earth metal hydroxides such as magnesium hydroxide, calcium hydroxide, and barium hydroxide; alkali metal carbonates such as lithium carbonate, sodium carbonate, potassium carbonate, and cesium carbonate; alkaline earth metal carbonates such as magnesium carbonate; alkali metal hydrogencarbonates such as lithium hydrogencarbonate, sodium hydrogencarbonate, potassium hydrogencarbonate, and cesium hydrogencarbonate; alkali metal organic acid salts such as lithium acetate, sodium acetate, potassium acetate, and cesium acetate, of which acetates are typified; alkaline earth metal organic acid salts such as magnesium acetate, of which acetates are typified; alkali metal alkoxides such as lithium methoxide, sodium methoxide, sodium ethoxide, sodium isopropoxide, potassium ethoxide, and potassium t-butoxide; alkali metal phenoxides such as sodium phenoxide; amines such as triethylamine, N-methylpiperidine, 1,8-diazabicyclo[5.4.0]undec-7-ene, and 1,5-diazabicyclo[4.3.0]non-5-ene, of which tertiary amines are typified; and nitrogen-containing aromatic heterocyclic compounds such as pyridine, 2,2'-bipyridyl, and 1,10-phenanthroline. Each of different catalysts may be used alone or in combination. The catalyst(s) may be used in the form of a solution or dispersion typically in water and/or a solvent.

The amount of the catalyst(s) is not limited and may be adjusted as appropriate within the range of 0.002 to 0.200 mole per mole of the total amount of the hydrolyzable silane compound(s).

The amount of water in the hydrolysis and condensation is not limited and may be adjusted as appropriate within the range of 0.5 to 20 moles per mole of the total amount of the hydrolyzable silane compound(s).

The water may be added in any manner not limited, and may be added collectively in the whole quantity (total amount to be used), or sequentially. The water, when added sequentially, may be added continuously or intermittently.

It is important to select, in particular, such reaction conditions for the hydrolysis and condensation of the hydrolyzable silane compound(s) that the resulting polyorganosilsesquioxane for use in the present invention has a T3 to T2 ratio of 5 or more. The reaction temperature of the hydrolysis and condensation is not limited, but preferably 40° C. to 100° C., and more preferably 45° C. to 80° C. The hydrolysis and condensation, when performed at a reaction temperature controlled within the range, tends to enable more efficient control of the T3 to T2 ratio to 5 or more. The reaction time of the hydrolysis and condensation is not limited, but preferably 0.1 to 10 hours, and more preferably 1.5 to 8 hours. The hydrolysis and condensation may be performed at normal atmospheric pressure, under pressure (under a load), or under reduced pressure. The hydrolysis and condensation may be performed in any of atmospheres exemplified typically by inert gas atmospheres such as nitrogen atmosphere and argon atmosphere; and atmospheres in the presence of oxygen, such as air atmosphere. However, the hydrolysis and condensation is preferably performed in an inert gas atmosphere.

The hydrolysis and condensation of the hydrolyzable silane compound(s) gives the polyorganosilsesquioxane for use in the present invention. After the completion of the hydrolysis and condensation, the catalyst is preferably neutralized so as to restrain the ring opening of epoxy groups. The polyorganosilsesquioxane for use in the present invention may be separated/purified typically by a separation method such as water washing, acid washing, alkali washing, filtration, concentration, distillation, extraction, crystallization, recrystallization, or column chromatography, or a separation method as any combination of them.

Compound (A)

The compound (A) is a compound represented by Formula (X). Each of different compounds (A) may be used alone or in combination. Formula (X) is expressed as follows:

[Chem. 1]

In Formula (X), r1 represents an integer from 4 to 20, and is preferably an integer from 5 to 15, and more preferably an integer from 6 to 12. The compound (A), as having r1 of 4 or more, allows the first curable composition according to the present invention to give a cured product and an adhesive sheet according to the present invention, each of which has cracking resistance, and adhesiveness and adhesion to an adherend at excellent levels.

In Formula (X), each occurrence of $R^{11}$ and $R^{12}$ independently represents an optionally substituted hydrocarbon group. Non-limiting examples of the optionally substituted hydrocarbon group include monovalent substituted or unsubstituted hydrocarbon groups. They are exemplified typically by alkyls such as methyl, ethyl, propyl, butyl, pentyl, and hexyl; cycloalkyls such as cyclopropyl, cyclobutyl, cyclopentyl, cyclohexyl, and cyclododecyl; alkenyls such as vinyl, allyl, butenyl, pentenyl, and hexenyl; aryls such as phenyl, tolyl, xylyl, and naphthyl; cycloalkylalkyls such as cyclohexylmethyl and methylcyclohexyl; aralkyls such as benzyl and phenethyl; and halogenated hydrocarbon groups resulting from replacing one or more hydrogen atoms in hydrocarbon groups with halogen atoms, such as chloromethyl, 3-chloropropyl, 3,3,3-trifluoropropyl, and other halogenated alkyls. Non-limiting examples of a substituent or substituents in the optionally substituted hydrocarbon group include halogens, hydroxy, and carboxy. Non-limiting examples of the substituents also include groups each including two or more of the monovalent substituted or unsubstituted hydrocarbon groups bonded to each other through a linkage group. Non-limiting examples of the linkage group include ether bond (—O—), thioether bond (—S—), ester bond (—CO—O—), amido bond (—CO—NH—), and carbonyl (—CO—).

The optionally substituted hydrocarbon group is particularly preferably selected from linear or branched alkyls having 1 to 10 carbon atoms (linear or branched $C_1$-$C_{10}$ alkyls). Non-limiting examples of the linear or branched $C_1$-$C_{10}$ alkyls include methyl, ethyl, propyl, isopropyl, butyl, isobutyl, s-butyl, t-butyl, pentyl, hexyl, heptyl, octyl, and ethylhexyl. Among the alkyls, preferred are linear or branched $C_1$-$C_4$ alkyls such as methyl, ethyl, propyl, isopropyl, butyl, isobutyl, s-butyl, and t-butyl. Specifically, in particular, each occurrence of $R^{11}$ is preferably selected from linear or branched $C_1$-$C_{10}$ alkyls, and particularly preferably selected from linear or branched $C_1$-$C_4$ alkyls; and each occurrence of $R^{12}$ is preferably selected from linear or branched $C_1$-$C_{10}$ alkyls, and particularly preferably selected from linear or branched $C_1$-$C_4$ alkyls.

In Formula (X), L represents a group containing at least one group selected from the class consisting of epoxy, oxetanyl, and vinyl ether groups. The group, when containing an epoxy group, is preferably selected from epoxy, glycidyl ether group, 3,4-epoxycyclohexyl, and 3,4-epoxy-3-methylcyclohexyl; and is more preferably selected from glycidyl ether group and 3,4-epoxycyclohexyl. Non-limiting examples of the group, when containing an oxetanyl group, include (3-ethyl-3-oxetanyl)methyloxy and (3-ethyl-3-oxetanyl)oxy. Non-limiting examples of the group, when containing a vinyl ether group, include vinyl ether groups.

In Formula (X), s1 represents an integer from 1 to 3, and t1 represents an integer from 0 to 2, where s1 plus t1 equals 3.

In Formula (X), each occurrence of $R^{13}$ and $R^{14}$ is independently selected from hydrogen and an optionally substituted hydrocarbon group. Non-limiting examples of the optionally substituted hydrocarbon group are as with those exemplified and described as $R^{11}$ and $R^{12}$ in Formula (X). In particular, each occurrence of $R^{13}$ is preferably selected from hydrogen and linear or branched $C_1$-$C_{10}$ (in particular, $C_1$-$C_4$) alkyls and is more preferably hydrogen; and each occurrence of $R^{14}$ is preferably selected from hydrogen and linear or branched $C_1$-$C_{10}$ (in particular, $C_1$-$C_4$) alkyls and is more preferably hydrogen. The r1 occurrences of $R^{13}$ may be identical to or different from one another; and the r1 occurrences of $R^{14}$ may be identical to or different from one another.

In particular, the compound (A) is preferably at least one epoxy-containing silane compound selected from the class consisting of compounds represented by Formula (X1) and compounds represented by Formula (X2):

[Chem. 11]

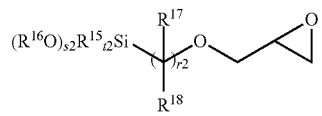

(X1)

[Chem. 12]

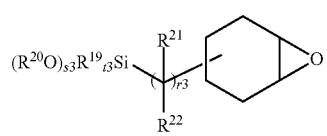

(X2)

In Formula (X1), r2 represents an integer from 4 to 20, and is preferably an integer from 5 to 15, and more preferably an integer from 6 to 12. The compounds, as having r2 of 4 or more, allow the first curable composition according to the present invention to give a cured product and an adhesive sheet according to the present invention, each of which has cracking resistance, and adhesiveness and adhesion to an adherend at excellent levels.

In Formula (X1), each occurrence of $R^{15}$ and $R^{16}$ independently represents an optionally substituted hydrocarbon group. Non-limiting examples of the optionally substituted hydrocarbon group include those exemplified and described as $R^{11}$ and $R^{12}$ in Formula (X). In particular, each occurrence of $R^{15}$ is preferably selected from linear or branched $C_1$-$C_{10}$ alkyls and particularly preferably selected from linear or branched $C_1$-$C_4$ alkyls, and each occurrence of $R^{16}$ is preferably selected from linear or branched $C_1$-$C_{10}$ alkyls and particularly preferably selected from linear or branched $C_1$-$C_4$ alkyls.

In Formula (X1), s2 represents an integer from 1 to 3, and t2 represents an integer from 0 to 2, where s2 plus t2 equals 3.

In Formula (X1), each occurrence of $R^{17}$ and $R^{18}$ is independently selected from hydrogen and an optionally substituted hydrocarbon group. Non-limiting examples of the optionally substituted hydrocarbon group include those exemplified and described as $R^{13}$ and $R^{14}$ in Formula (X). In particular, each occurrence of $R^{17}$ is preferably selected from hydrogen and linear or branched $C_1$-$C_{10}$ (in particular, $C_1$-$C_4$) alkyls and is more preferably hydrogen. In particular, each occurrence of $R^{18}$ is preferably selected from hydrogen and linear or branched $C_1$-$C_{10}$ (in particular, $C_1$-$C_4$) alkyls and is more preferably hydrogen. The r2 occurrences of $R^{17}$ may be identical to or different from one another, and the r2 occurrences of $R^{18}$ may be identical to or different from one another.

Examples of the compounds represented by Formula (X1) include, but are not limited to, 6-glycidoxyhexyltrimethoxysilane, 6-glycidoxyhexylmethyldimethoxysilane, 6-glycidoxyhexyltriethoxysilane, 6-glycidoxyhexylmethyldiethoxysilane, 8-glycidoxyoctyltrimethoxysilane, 8-glycidoxyoctylmethyldimethoxysilane, 8-glycidoxyoctyltriethoxysilane, and 8-glycidoxyoctylmethyldiethoxysilane.

In Formula (X2), r3 represents an integer from 4 to 20, and is preferably an integer from 5 to 15, and more preferably an integer from 6 to 12. The compounds, as having r3 of 4 or more, allow the first curable composition according to the present invention to give a cured product and an adhesive sheet according to the present invention, each of which has cracking resistance, and adhesiveness and adhesion to an adherend at excellent levels.

In Formula (X2), each occurrence of $R^{19}$ and $R^{20}$ independently represents an optionally substituted hydrocarbon group. Non-limiting examples of the optionally substituted hydrocarbon group include those exemplified and described as $R^{11}$ and $R^{12}$ in Formula (X). In particular, each occurrence of $R^{19}$ is preferably selected from linear or branched $C_1$-$C_{10}$ alkyls and particularly preferably selected from linear or branched $C_1$-$C_4$ alkyls; and each occurrence of $R^{20}$ is preferably selected from linear or branched $C_1$-$C_{10}$ alkyls, and particularly preferably selected from linear or branched $C_1$-$C_4$ alkyls.

In Formula (X2), s3 represents an integer from 1 to 3, and t3 represents an integer from 0 to 2, where s3 plus t3 equals 3.

In Formula (X2), each occurrence of $R^{21}$ and $R^{22}$ is independently selected from hydrogen and an optionally substituted hydrocarbon group. Non-limiting examples of the optionally substituted hydrocarbon group include those exemplified and described as $R^{13}$ and $R^{14}$ in Formula (X). In particular, each occurrence of $R^{21}$ is preferably selected from hydrogen and linear or branched $C_1$-$C_{10}$ (in particular, $C_1$-$C_4$) alkyls and is more preferably hydrogen; and each occurrence of $R^{22}$ is preferably selected from hydrogen and linear or branched $C_1$-$C_{10}$ (in particular, $C_1$-$C_4$) alkyls and is more preferably hydrogen. The r3 occurrences of $R^{21}$ may be identical to or different from one another, and the r3 occurrences of $R^{22}$ may be identical to or different from one another.

Examples of the compounds represented by Formula (X2) include, but are not limited to, 6-(3,4-epoxycyclohexyl) hexyltrimethoxysilane, 6-(3,4-epoxycyclohexyl)hexylmethyldimethoxysilane, 6-(3,4-epoxycyclohexyl)hexyltriethoxysilane, 6-(3,4-epoxycyclohexyl) hexylmethyldiethoxysilane, 8-(3,4-epoxycyclohexyl) octyltrimethoxysilane, 8-(3,4-epoxycyclohexyl) octylmethyldimethoxysilane, 8-(3,4-epoxycyclohexyl) octyltriethoxysilane, and 8-(3,4-epoxycyclohexyl) octylmethyldiethoxysilane.

Polymerization Stabilizer (B)

The polymerization stabilizer (B) in the curable composition according to the present invention is a compound that functionally traps cations to restrain cationic polymerization from proceeding and, when its cation-trapping capability becomes saturated and is lost, allows the polymerization to proceed. The second curable composition according to the present invention contains the polymerization stabilizer (B). This curable composition, when applied and dried, can form an adhesive layer which resists polymerization progress over a long term after its formation, which offers excellent adhesiveness by heating timely when adhesiveness is required, and which has excellent storage stability (long pot life).

Non-limiting examples of the polymerization stabilizer (B) include hindered amine compounds such as bis(2,2,6,6-tetramethyl-4-piperidyl) sebacate, poly([6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imino]), tetrakis(2,2,6,6-tetramethyl-4-piperidyl) butane-1,2,3,4-tetracarboxylate, 2,2,6,6-tetramethyl-4-piperidinyl benzoate, (mixed 2,2,6,6-tetramethyl-4-piperidyl/tridecyl) 1,2,3,4-butanetetracarboxylate, 3,9-bis(2,3-di-t-butyl-4-methylphenoxy)-2,4,8,10-tetraoxa-3,9-diphosphaspiro[5.5]undecane, mixed (2,2,6,6-tetramethyl-4-piperidyl/β,β,β',β'-tetramethyl-3,9-[2,4,8,10-tetraoxaspiro[5.5]undecane]diethyl) 1,2,3,4-butanetetracarboxylate, poly([6-N-morpholyl-1,3,5-triazine-2,4-diyl][(2,2,6,6-tetramethyl-4-piperidyl)imino] hexamethylene[(2,2,6,6-tetramethyl-4-piperidyl)imino]), [N-(2,2,6,6-tetramethyl-4-piperidyl)-2-methyl-2-(2,2,6,6-tetramethyl-4-piperidyl)imino]propionamide, trade names LA-77, LA-67, and LA-57 (each supplied by ADEKA CORPORATION), trade names TINUVIN 123 and TINUVIN 152 (each supplied by Ciba Japan K.K.); sulfonium sulfate compounds exemplified typically by (4-hydroxyphenyl)dimethylsulfonium methylsulfite (such as trade name Auxiliary for San-Aid SI series, supplied by SANSHIN CHEMICAL INDUSTRY CO., LTD.); and phosphite compounds such as trade name ADK STAB PEP-36 (supplied by ADEKA CORPORATION). In particular, the polymerization stabilizer (B) is preferably at least one selected from sulfonium sulfate compounds and phosphite compounds. These compounds are preferred from the viewpoints of more impeding partial curing during drying of the adhesive and allowing the cured product to have still better adhesiveness to an adherend.

The curable composition may contain each of different polymerization stabilizers (B) alone or in combination. In particular, the second curable composition according to the present invention preferably contains two or more different polymerization stabilizers (B) in combination. The curable composition, when having this configuration, tends to have significantly excellent storage stability and to still resist partial curing during drying of the adhesive, and to give a cured product having still better adhesiveness to an adherend. The curable composition preferably contains one or more sulfonium sulfate compounds and one or more phosphite compounds in combination as the two or more different polymerization stabilizers (B).

Curable Compositions

The first curable composition according to the present invention is a curable composition (curable resin composition) including the compound (A) and the polyorganosilsesquioxane for use in the present invention as essential components. The first curable composition according to the present invention, as employing the specific polyorganosilsesquioxane and the compound (A) having a specific configuration in combination, can form a cured product that has cracking resistance, heat resistance, and adhesiveness and adhesion to an adherend at excellent levels. The second curable composition according to the present invention is a curable composition (curable resin composition) including the polymerization stabilizer (B) and the polyorganosilsesquioxane for use in the present invention as essential components. The curable composition according to the present invention may further include one or more other components, as described below. Non-limiting examples of the other components include polymerization initiators (in particular, cationic-polymerization initiators); and surface conditioners or surface modifiers.

The curable composition according to the present invention may include each of different polyorganosilsesquioxanes for use in the present invention alone or in combination.

The content (proportion) of the polyorganosilsesquioxane(s) for use in the present invention in the curable composition according to the present invention is not limited, but preferably from 70 weight percent to less than 100 weight percent, more preferably 80 to 99.8 weight percent, and furthermore preferably 90 to 99.5 weight percent, of the total amount (100 weight percent) of the curable composition excluding solvent. The curable composition, when containing the polyorganosilsesquioxane(s) for use in the present invention in a content of 70 weight percent or more, tends to give a cured product having cracking resistance, heat resistance, and adhesiveness at still better levels.

The first curable composition according to the present invention may contain the compound(s) (A) in a content (proportion) not limited, but preferably 0.01 to 10 parts by weight, more preferably 0.1 to 7 parts by weight, and furthermore preferably 0.5 to 5 parts by weight, per 100 parts by weight of the polyorganosilsesquioxane for use in the present invention. The curable composition, when containing the compound(s) (A) in a proportion of 0.01 part by weight or more, tends to give a cured product having cracking resistance, adhesiveness and adhesion to an adherend at still better levels. The curable composition, when containing the compound(s) (A) in a proportion of 10 parts by weight or less, tends to give a cured product having adhesiveness and adhesion to an adherend at still better levels.

The content (proportion) of the polymerization stabilizer(s) (B) in the second curable composition according to the present invention is not limited, but preferably 0.005 part by weight or more, more preferably 0.01 to 10 parts by weight, and furthermore preferably 0.02 to 1 part by weight, per 100 parts by weight of the polyorganosilsesquioxane for use in the present invention. The curable composition, when containing the polymerization stabilizer(s) (B) in a proportion of 0.005 part by weight or more, tends to still resist partial curing during drying of the adhesive and to give a cured product having adhesiveness to an adherend at still better level. In particular, when the curable composition contains two or more different polymerization stabilizers (B), the curable composition may contain the polymerization stabilizers (B) in a total proportion of preferably 0.1 to 10 parts by weight, and more preferably 0.2 to 1 part by weight, per 100 parts by weight of the polyorganosilsesquioxane for use in the present invention.

In the case that the second curable composition according to the present invention contains an after-mentioned polymerization initiator, the content (proportion) of the polymerization stabilizer(s) (B) is not limited, but preferably 1 part by weight or more, more preferably 3 to 200 parts by weight, and particularly preferably 5 to 150 parts by weight, per 100 parts by weight of the polymerization initiator. The curable composition, when containing the polymerization stabilizer(s) (B) in a proportion of 1 part by weight or more, tends to resist partial curing during drying of the adhesive and to give a cured product having adhesiveness to an adherend at still better level. In particular, the curable composition, when containing two or more different polymerization stabilizers (B) in combination, may contain the polymerization stabilizers (B) in a total proportion of preferably 100 to 200 parts by weight, and more preferably 110 to 150 parts by weight, per 100 parts by weight of the polymerization initiator.

The proportion of the polyorganosilsesquioxane for use in the present invention in the curable composition according to the present invention is not limited, but preferably 70 to 100 weight percent, more preferably 75 to 100 weight percent, and furthermore preferably 80 to 100 weight percent, of the total amount (100 weight percent) of all cationically curable compounds in the curable composition. The curable composition, when containing the polyorganosilsesquioxane for use in the present invention in a content of 70 weight percent or more, tends to give a cured product having still better heat resistance.

Polymerization Initiator

Examples of the polymerization initiator include cationic-polymerization initiators and anionic-polymerization initiators. The cationic-polymerization initiators are compounds that generate cationic species upon heating to initiate curing reactions of polymerizable compounds. The anionic-polymerization initiators are compounds that generate anionic species upon heating to initiate curing reactions of polymerizable compounds. The curable composition according to the present invention, when containing such a polymerization initiator, can be cured within a shorter time for the resulting cured product to become tack-free. The curable composition may contain each of different polymerization initiators alone or in combination.

The present invention preferably employs any of polymerization initiators having after-mentioned curing properties. This is preferred because as follows. The curable composition, when containing a polymerization initiator of this type, can rapidly form an adhesive layer by heating/drying, approximately without progress of curing reactions. In addition, the resulting adhesive layer characterfully does not offer adhesiveness at temperatures lower than 50° C., but develops adhesiveness upon heating at such a temperature as to restrain damage on semiconductor chips, and is thereafter rapidly cured to become tack-free.

Specifically, a cationic-polymerization initiator, when to be used, is preferably a polymerization initiator that gives a composition having a thermal curing time of 3.5 minutes or longer (typically 3.5 to 7.0 minutes, and preferably 4.5 to 6.0 minutes) at 130° C., where the composition results from adding 1 part by weight of the cationic-polymerization initiator to 100 parts by weight of 3,4-epoxycyclohexylmethyl (3',4'-epoxy)cyclohexanecarboxylate (such as CEL-LOXIDE 2021P (trade name, supplied by Daicel Corporation)).

An anionic-polymerization initiator, when to be used, is preferably a polymerization initiator that gives a composition having a thermal curing time (in accordance with JIS K5909 1994) of 3.5 minutes or longer at 130° C., where the composition results from adding 1 part by weight of the anionic-polymerization initiator to 100 parts by weight of bisphenol-A diglycidyl ether.

As used herein, the term "thermal curing time" refers to a time (duration) necessary for the curable composition to become rubbery upon heating on a hot plate (more specifically, a time necessary for the curable composition to undergo curing progress to thereby become unliftable as a thread from the needlepoint of the measuring needle), where the time is determined in accordance with JIS K 5909:1994. The curable composition, when containing such polymerization initiator having a thermal curing time of 3.5 minutes or longer, tends to give an adhesive layer having more excellent storage stability, because the polymerization initiator having this configuration less generates, upon heating/drying, cationic species in the case of a cationic-polymerization initiator, or anionic species in the case of an anionic-polymerization initiator, and this restrains polymerization to proceed subsequently at room temperature.

The cationic-polymerization initiators each include a cationic moiety and an anionic moiety. The cationic moiety absorbs heat, and the anionic moiety acts as an acid source. Non-limiting examples of the cationic-polymerization initiators include arylsulfonium salts, aryliodonium salts, arene-ion complexes, quaternary ammonium salts, aluminum chelates, and boron trifluoride amine complexes. Among them, arylsulfonium salts are preferred.

Non-limiting examples of the cationic moieties in the arylsulfonium salts include arylsulfonium ions such as (4-hydroxyphenyl)methylbenzylsulfonium ion, triphenylsulfonium ion, diphenyl[4-(phenylthio)phenyl]sulfonium ion, 4-(4-biphenylylthio)phenyl-4-biphenylylphenylsulfonium ion, and tri-p-tolylsulfonium ion, of which triarylsulfonium ions are typified.

Non-limiting examples of the anionic moieties in the arylsulfonium salts include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, sulfonate anions (such as trifluoromethanesulfonate anion, pentafluoroethanesulfonate anion, nonafluorobutanesulfonate anion, methanesulfonate anion, benzenesulfonate anion, and p-toluenesulfonate anion), $(CF_3SO_2)_3C^-$, $(CF_3SO_2)_2N^-$, perhalogen acid ions, halogenated sulfonate ions, sulfate ions, carbonate ions, aluminate ions, hexafluorobismuthate ion, carboxylate ions, arylborate ions, thiocyanate ions, and nitrate ions.

The cationic-polymerization initiators for use herein may be selected from commercial products available typically under the trade names of San-Aid SI-110L, San-Aid SI-145L, San-Aid SI-150L, San-Aid SI-160L, and San-Aid SI-180L (each from SANSHIN CHEMICAL INDUSTRY CO., LTD.).

Examples of the anionic-polymerization initiators include, but are not limited to, primary amines, secondary amines, tertiary amines, imidazoles, and boron trifluoride-amine complexes. Non-limiting examples of the imidazoles include 2-ethyl-4-methylimidazole, 2-phenylimidazole, 1-(2-cyanoethyl)-2-ethyl-4-methylimidazole, 2,4-diamino-6-[2-methylimidazolyl-(1)]ethyl-s-triazine, 2-phenylimidazoline, 2,3-dihydro-1H-pyrrolo[1,2-a]benzimidazole, 1-cyanoethyl-2-methylimidazole, and 1-cyanoethyl-2-undecylimidazole. Non-limiting examples of the tertiary amines include tris(dimethylaminomethyl)phenol, benzyldimethylamine, and 1,8-diazabicyclo[5.4.0]undecene-7 (DBU).

The polymerization initiator for use in the present invention is preferably selected from cationic-polymerization initiators, particularly preferably selected from cationic thermal initiators, and most preferably selected from arylsulfonium salts.

When the curable composition according to the present invention contains a polymerization initiator, the content (proportion) of the polymerization initiator is not limited, but preferably 0.01 to 3.0 parts by weight, more preferably 0.05 to 3.0 parts by weight, furthermore preferably 0.1 to 1.0 part by weight, and particularly preferably 0.3 to 0.8 part by weight, per 100 parts by weight of the polyorganosilsesquioxane for use in the present invention. The curable composition, when containing the polymerization initiator in a proportion of 0.01 part by weight or more, tends to allow the curing reaction to proceed efficiently sufficiently, and to give a cured product having still better adhesiveness. In contrast, the curable composition, when containing the polymerization initiator in a proportion of 3.0 parts by weight or less, tends to have better storage stability (shelf life) and/or to allow the cured product to resist coloring.

The curable composition according to the present invention may further include one or more other cationically curable compounds. The term "other cationically curable compounds" refers to cationically curable compounds excluding the compounds (A) and the polyorganosilsesquioxanes for use in the present invention. The other cationically curable compounds for use herein may be selected from known or common cationically curable compounds, are not limited, but are exemplified typically by other epoxy compounds, other oxetane compounds, and other vinyl ether compounds. The term "other epoxy compounds" refers to epoxy compounds excluding the compounds (A) and the polyorganosilsesquioxanes for use in the present invention.

The term "other oxetane compounds" refers to oxetane compounds excluding the compounds (A). The term "other vinyl ether compounds" refers to vinyl ether compounds excluding the compounds (A). The curable composition according to the present invention may contain each of different other cationically curable compounds alone or in combination.

The other epoxy compounds for use herein may be selected from known or common compounds each containing one or more epoxy groups (oxirane rings) in a molecule, are not limited, but are exemplified typically by cycloaliphatic epoxy compounds (cycloaliphatic epoxy resins), aromatic epoxy compounds (aromatic epoxy resins), and aliphatic epoxy compound (aliphatic epoxy resins).

The cycloaliphatic epoxy compounds may be selected from known or common compounds each containing one or more alicycles and one or more epoxy groups in a molecule, are not limited, but are exemplified typically by (1) compounds each containing a cycloaliphatic epoxy group in a molecule, where the cycloaliphatic epoxy group is an epoxy group containing an oxygen atom bonded in a triangular arrangement to adjacent two carbon atoms constituting an alicycle; (2) compounds containing an alicycle, and an epoxy group bonded to the alicycle directly through a single bond; and (3) compounds each containing an alicycle and a glycidyl ether group in a molecule (glycidyl ether epoxy compounds).

Non-limiting examples of the compounds (1) containing a cycloaliphatic epoxy group in a molecule include compounds represented by Formula (i):

[Chem. 21]

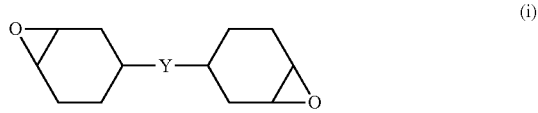

(i)

In Formula (i), Y is selected from a single bond and a linkage group (divalent group having one or more atoms). Non-limiting examples of the linkage group include divalent hydrocarbon groups, alkenylenes with part or all of carbon-carbon double bond(s) being epoxidized, carbonyl, ether bond, ester bond, carbonate group, amido, and groups each including two or more of them linked to each other.

Examples of the divalent hydrocarbon groups include, but are not limited to, $C_1$-$C_{18}$ linear or branched alkylenes and divalent alicyclic hydrocarbon groups. Non-limiting examples of the $C_1$-$C_{18}$ linear or branched alkylenes include methylene, methylmethylene, dimethylmethylene, ethylene, propylene, and trimethylene. Non-limiting examples of the divalent alicyclic hydrocarbon groups include divalent cycloalkylenes (including cycloalkylidenes), such as 1,2-cyclopentylene, 1,3-cyclopentylene, cyclopentylidene, 1,2-cyclohexylene, 1,3-cyclohexylene, 1,4-cyclohexylene, and cyclohexylidene.

The alkenylenes with part or all of carbon-carbon double bond(s) being epoxidized are also referred to as "epoxidized alkenylenes". Non-limiting examples of alkenylenes from which the epoxidized alkenylenes are derived include $C_2$-$C_8$ linear or branched alkenylenes such as vinylene, propenylene, 1-butenylene, 2-butenylene, butadienylene, pentenylene, hexenylene, heptenylene, and octenylene. In particular, of the epoxidized alkenylenes, preferred are alkenylenes with all of carbon-carbon double bond(s) being epoxidized, and more preferred are $C_2$-$C_4$ alkenylenes with all of carbon-carbon double bond(s) being epoxidized.

Representative, but non-limiting examples of the cycloaliphatic epoxy compounds represented by Formula (i) include 3,4,3',4'-diepoxybicyclohexane, and compounds represented by Formulae (i-1) to (i-10) below. In Formulae (i-5) (i-7), l and m each independently represent an integer from 1 to 30. In Formula (i-5), R' represents, independently in each occurrence, $C_1$-$C_8$ alkylene and, in particular, is preferably selected from $C_1$-$C_3$ linear or branched alkylenes such as methylene, ethylene, propylene, and isopropylene. In Formulae (i-9) and (i-10), n1 to n6 each independently represent an integer from 1 to 30. Non-limiting examples of the cycloaliphatic epoxy compounds represented by Formula (i) also include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl) ether. Formulae (i-1) to (i-10) are expressed as follows:

[Chem. 22]

(I-1)
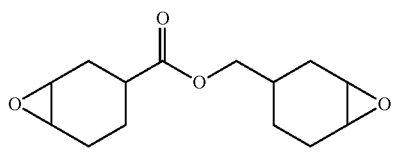

(I-2)
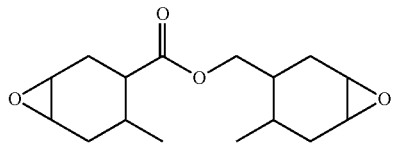

(I-3)
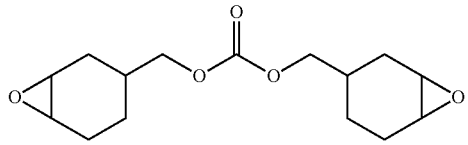

(I-4)
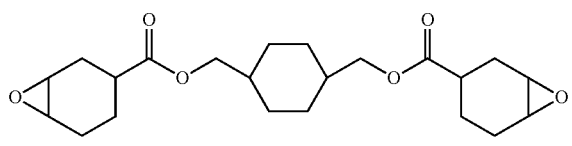

(I-5)
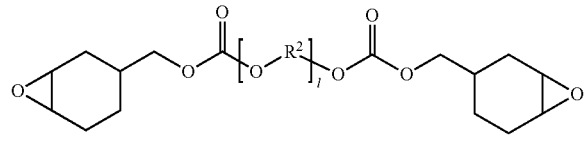

(I-6)
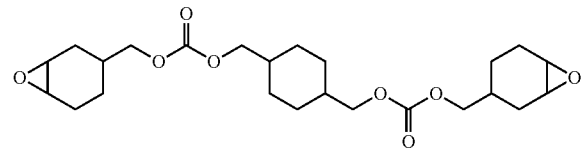

(I-7)
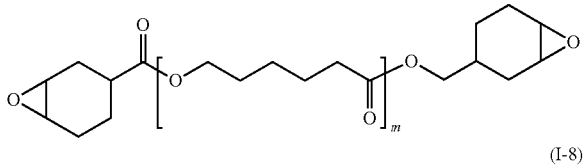

(I-8)
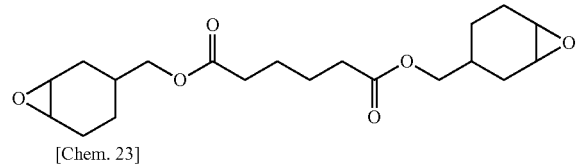

[Chem. 23]

(I-9)
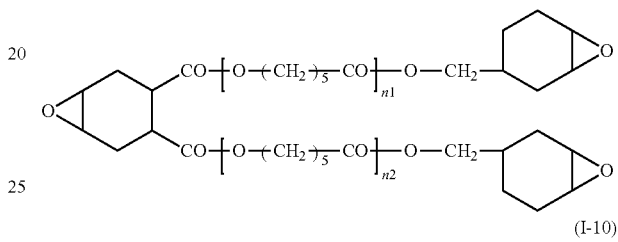

(I-10)
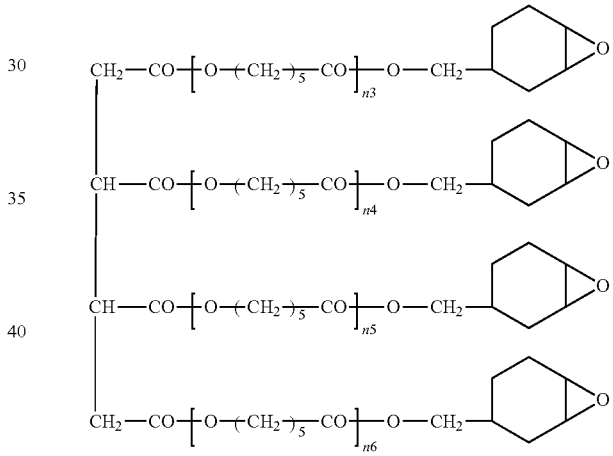

Non-limiting examples of the compounds (2) each containing an alicycle, and an epoxy group bonded to the alicycle directly through a single bond include compounds represented by Formula (ii):

[Chem. 24]

(ii)
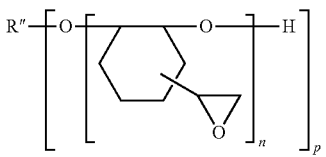

In Formula (ii), R" represents a group (p-valent organic group) resulting from removing "p" hydroxy (—OH) group(s) from the structural formula of a p-hydric alcohol; and p and n each independently represent a natural number. Non-limiting examples of the p-hydric alcohol (R"(OH)$_p$) include polyhydric alcohols such as 2,2-bis(hydroxymethyl)-1-butanol, of which $C_1$-$C_{15}$ alcohols are typified. The number p is preferably 1 to 6, and n is preferably 1 to 30. When p is 2 or more, the "p" occurrences of n in the groups in the brackets (outer brackets) may be identical or different. Specifically, a non-limiting example of the compounds represented by Formula (ii) is a 1,2-epoxy-4-(2-oxiranyl)cyclohexane adduct of 2,2-bis(hydroxymethyl)-1-butanol, such as EHPE 3150 (trade name, supplied by Daicel Corporation).

Non-limiting examples of the compounds (3) containing an alicycle and a glycidyl ether group in a molecule include glycidyl ethers of alicyclic alcohols (in particular, of alicyclic polyhydric alcohols). More specifically, non-limiting examples of the compounds (3) include hydrogenated bisphenol-A epoxy compounds, which are compounds resulting from hydrogenating bisphenol-A epoxy compounds, such as 2,2-bis[4-(2,3-epoxypropoxy)cyclohexyl]propane and 2,2-bis[3,5-dimethyl-4-(2,3-epoxypropoxy)cyclohexyl]propane; hydrogenated bisphenol-F epoxy compounds, which are compounds resulting from hydrogenating bisphenol-F epoxy compounds, such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; hydrogenated biphenol epoxy compounds; hydrogenated phenol novolac epoxy compounds; hydrogenated cresol novolac epoxy compounds; hydrogenated cresol novolac epoxy compounds derived from bisphenol-A; hydrogenated naphthalene epoxy compounds; hydrogenated epoxy compounds resulting from hydrogenating epoxy compounds derived from trisphenolmethane; and hydrogenated epoxy compounds resulting from hydrogenating undermentioned aromatic epoxy compounds.

Non-limiting examples of the aromatic epoxy compounds include epi-bis glycidyl ether epoxy resins resulting from condensing bisphenols with epihalohydrins, where the bisphenols are exemplified typically by bisphenol-A, bisphenol-F, bisphenol-S, and fluorene bisphenol; high-molecular-weight epi-bis glycidyl ether epoxy resins resulting from further subjecting the epi-bis glycidyl ether epoxy resins to addition reactions with the bisphenols; novolac alkyl glycidyl ether epoxy resins resulting from condensing phenols with aldehydes to give polyhydric alcohols, and further condensing the polyhydric alcohols with epihalohydrins, where the phenols are exemplified typically by phenol, cresols, xylenols, resorcinol, catechol, bisphenol-A, bisphenol-F, and bisphenol-S, and the aldehydes are exemplified typically by formaldehyde, acetaldehyde, benzaldehyde, hydroxybenzaldehyde, and salicylaldehyde; and epoxy compounds each containing a fluorene ring and two phenolic skeletons bonded at the 9-position of the fluorene ring and containing glycidyl groups bonded, directly or through alkyleneoxy, to oxygen atoms, where the oxygen atoms result from removing hydrogen atoms from the hydroxy groups of the phenolic skeletons.

Non-limiting examples of the aliphatic epoxy compounds include glycidyl ethers of q-hydric alcohols devoid of cyclic structures, where q represents a natural number; glycidyl esters of monovalent or multivalent carboxylic acids (such as acetic acid, propionic acid, butyric acid, stearic acid, adipic acid, sebacic acid, maleic acid, and itaconic acid); epoxidized derivatives of double-bond-containing fats and oils, such as epoxidized linseed oils, epoxidized soybean oils, and epoxidized castor oils; and epoxidized derivatives of polyolefins (including polyalkadienes), such as epoxidized polybutadienes. Non-limiting examples of the q-hydric alcohols devoid of cyclic structures include monohydric alcohols such as methanol, ethanol, 1-propyl alcohol, isopropyl alcohol, and 1-butanol; dihydric alcohols such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycols, and polypropylene glycols; and trihydric or higher polyhydric alcohols such as glycerol, diglycerol, erythritol, trimethylolethane, trimethylolpropane, pentaerythritol, dipentaerythritol, and sorbitol. The q-hydric alcohol may also be selected typically from polyether polyols, polyester polyols, polycarbonate polyols, and polyolefin polyols.

The other oxetane compounds may be selected from known or common compounds each containing one or more oxetane rings in a molecule, are not limited, but are exemplified typically by 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl} ether, 4,4'-bis[(3-ethyl-3-oxetanyl)methoxymethyl]bicyclohexyl, 1,4-bis[(3-ethyl-3-oxetanyl)methoxymethyl]cyclohexane, 1,4-bis{[(3-ethyl-3-oxetanyl)methoxy]methyl}benzene, 3-ethyl-3-{[(3-ethyloxetan-3-yl)methoxy]methyl}}oxetane, xylylene bisoxetanes, 3-ethyl-3-{[3-(triethoxysilyl)propoxy]methyl}oxetane, oxetanylsilsesquioxanes, and phenol novolac oxetane.

The other vinyl ether compounds for use herein may be selected from known or common compounds containing one or more vinyl ether groups in a molecule, are not limited, but are exemplified typically by 2-hydroxyethyl vinyl ether (ethylene glycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ethers, oligoethylene glycol divinyl ethers, polyethylene glycol monovinyl ethers, polyethylene glycol divinyl ethers, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropylene glycol monovinyl ethers, oligopropylene glycol divinyl ethers, polypropylene glycol monovinyl ethers, polypropylene glycol divinyl ethers, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol-A divinyl ether, bisphenol-F divinyl ether, hydroxyoxanorbornanemethanol divinyl ethers, 1,4-cyclohexanediol divinyl ether, pentaerythritol trivinyl ether, pentaerythritol tetravinyl ether, dipentaerythritol pentavinyl ether, and dipentaerythritol hexavinyl ether.

Of the other vinyl ether compounds, vinyl ether compounds containing one or more hydroxy groups in a molecule, when used as the other cationically curable compounds, advantageously give a cured product (adhesive layer) that has excellent thermal yellowing resistance (such a property as to resist yellowing due to heating). The number of hydroxy groups in a molecule of the vinyl ether compounds containing one or more hydroxy groups in a molecule is not limited, but preferably 1 to 4, and more preferably 1 or 2.

The content (proportion) of the other cationically curable compound(s) in the curable composition according to the present invention is not limited, but preferably 50 weight percent or less (e.g., 0 to 50 weight percent), more preferably 30 weight percent or less (e.g., 0 to 30 weight percent), and furthermore preferably 10 weight percent or less (e.g., 0 to 10 weight percent), of the total amount of the polyorganosilsesquioxane for use in the present invention and the other cationically curable compound(s) (100 weight percent; total amount of cationically curable compounds). The incorporation of the other cationically curable compound(s) in an amount within the range may impart desired performance or properties to the curable composition and/or to the cured product. For example, the incorporation may allow the curable composition to be rapidly curable and/or to have a controlled viscosity.

Solvent

Preferably, the curable composition according to the present invention may further contain a solvent. The solvent is exemplified typically by water and organic solvents and is not limited, as long as having solvent power on the polyorganosilsesquioxane for use in the present invention as well as on additives used as needed, and as long as not adversely affecting the polymerization.

The solvent is preferably selected from solvents that can impart, to the curable composition, fluidity suitable for application by spin-coating and can be easily removed by heating at such a temperature as to restrain polymerization from proceeding. The solvent is preferably at least one solvent selected from solvents having boiling points of 170° C. or lower at one atmospheric pressure, such as toluene, butyl acetate, methyl isobutyl ketone, xylenes, mesitylene, propylene glycol monomethyl ether, propylene glycol monomethyl ether acetate, and cyclohexanone.

The solvent is preferably used within such a range that the concentration of non-volatile components in the curable composition is typically about 30 to about 80 weight percent, preferably 40 to 70 weight percent, and particularly preferably 50 to 60 weight percent. This is preferred for excellent coatability upon spin coating. The curable composition, when containing the solvent in an excessively large amount, tends to have an excessively low viscosity and less successfully form a layer having an appropriate thickness (e.g., about 0.5 to about 30 μm). In contrast, the curable composition, when containing the solvent in an excessively small amount, tends to have an excessively high viscosity and to be less uniformly applied onto a support (base material) or an adherend.

The curable composition according to the present invention may further contain one or more types of common additives as other optional components. Non-limiting examples of the additives include fillers exemplified typically by inorganic fillers such as precipitated silica, hydrous silica (wet silica), fumed silica, pyrogenic silica, titanium oxide, alumina, glass, quartz, aluminosilicate, iron oxide, zinc oxide, calcium carbonate, carbon black, silicon carbide, silicon nitride, and boron nitride, as well as inorganic fillers resulting from treating these fillers with organosilicon compounds such as organohalosilanes, organoalkoxysilanes, and organosilazanes; fine powders of organic resins such as silicone resins, epoxy resins, and fluorocarbon resins; and conductive powders of metals such as silver and copper. Non-limiting examples of the additives also include curing agents such as amine curing agents, polyaminoamide curing agents, acid anhydride curing agents, and phenolic curing agents; curing assistants; curing accelerators such as imidazoles, alkali metal or alkaline earth metal alkoxides, phosphines, amide compounds, Lewis acid complex compounds, sulfur compounds, boron compounds, and condensable organometallic compounds; stabilizers such as antioxidants, ultraviolet absorbers, photostabilizers, thermal stabilizers, and heavy-metal deactivators; flame retardants such as phosphorus flame retardants, halogen flame retardants, and inorganic flame retardants; flame retardant promoters; reinforcers such as other fillers; nucleating agents; coupling agents such as silane coupling agents excluding the compounds (A); lubricants; waxes; plasticizers; release agents; impact modifiers; color modifiers (hue modifiers); clearing agents; rheology adjusters such as flow improvers; workability improvers; colorants such as dyes and pigments; antistatic agents; dispersants; surface conditioners such as leveling agents and anti-popping agents; surface modifiers such as slipping agents; delustering agents; antifoaming agents; foam inhibitors; defoaming agents; antimicrobial agents; antiseptic agents; viscosity modifiers; thickeners; photosensitizers; and blowing agents. The curable composition may include each of different additives alone or in combination. The content (proportion) of the additive(s) is not limited, but preferably 100 parts by weight or less, more preferably 30 parts by weight or less (e.g., 0.01 to 30 parts by weight), and furthermore preferably 10 parts by weight or less (e.g., 0.1 to 10 parts by weight), per 100 parts by weight of the polyorganosilsesquioxane for use in the present invention.

The curable composition according to the present invention may be prepared typically, but non-limitingly, by stirring and mixing the components at room temperature, or with heating as needed. The curable composition according to the present invention may be used as a one-part composition, or a multi-part composition such as a two-part composition. The one-part composition contains the components, which have been blended beforehand, and is used as intact. In contrast, in the multi-part composition, two or more parts (portions) of the components are stored separately, and the two or more parts are blended in predetermined proportions before use.

The curable composition according to the present invention is preferably, but non-limitingly, liquid at room temperature (about 25° C.). The viscosity of the curable composition according to the present invention is not limited, but is preferably adjusted according to the thickness of a film of the curable composition applied by spin coating. For example, the curable composition, when to be applied to form a film having a thickness of 0.1 to 50 μm, preferably has a viscosity within the range of 1 to 5000 mPa·s. The curable composition according to the present invention, when having a viscosity within the range, may more easily form a coat layer having a uniform thickness on a substrate such as a silicon wafer. The viscosity of the curable composition according to the present invention may be measured at an oscillation angle of 5%, a frequency of 0.1 to 100 s$^{-1}$, and a temperature of 25° C. using a viscometer (trade name MCR 301, supplied by Anton Paar GmbH).

Cured Product

The curable composition according to the present invention, when undergoing polymerization reaction of cationically curable compound(s) (such as the polyorganosilsesquioxane for use in the present invention) in the curable composition, can be cured to give a cured product. The resulting cured product is hereinafter also referred to as a "cured product according to the present invention". The cured product according to the present invention may be obtained typically as a cured product disposed on a substrate, by applying an after-mentioned adhesive sheet 1 according to the present invention onto an adherend and curing the curable composition. The curing technique may be selected as appropriate from well known techniques, is not limited, but is exemplified typically by the application of actinic radiation and/or heat. The actinic radiation may be any actinic radiation selected typically from infrared rays, visible light, ultraviolet rays, X rays, electron beams, alpha rays, beta rays, and gamma rays. Among them, the actinic radiation is preferably selected from ultraviolet rays for their excellent handleability.

The conditions, such as actinic radiation irradiation conditions, for the application of the actinic radiation to the curable composition according to the present invention are not limited and may be adjusted as appropriate according typically to the type and energy of the actinic radiation to be applied and the shape and size of the cured product. However, the application, when employing an ultraviolet ray, is preferably performed typically at about 1 to about 1000 mJ/cm$^2$. The application of actinic radiation may be performed typically using any of high-pressure mercury lamps, ultra-high pressure mercury lamps, xenon lamps, carbon arc, metal halide lamps, sunlight, LED lamps, and laser. After the application of actinic radiation, the work may be subjected further to a heat treatment (annealing and/or aging) to allow the curing reaction to further proceed.

The heating (heat application) to cure the curable composition according to the present invention may be performed under any conditions not limited, but is performed preferably typically at 30° C. to 200° C., and more preferably at 50° C. to 190° C., whereas the curing time can be determined as appropriate.

The cured product according to the present invention has excellent heat resistance, and its decomposition temperature is, though not limited, preferably 200° C. or higher (e.g., 200° C. to 500° C.), more preferably 260° C. or higher, and furthermore preferably 300° C. or higher. The heat decomposition temperature may be determined by the method described in examples (working examples).

The cured product resulting from curing the curable composition according to the present invention has adhesiveness and adhesion to an adherend at excellent levels. The curable composition according to the present invention is advantageously usable as an adhesive (hereinafter also referred to as an "adhesive composition") and, in particular, as a thermosetting adhesive. The curable composition, when cured, can be converted into an adhesive that has adhesiveness and adhesion to an adherend at excellent levels (further, into an adhesive that has cracking resistance, heat resistance, and adhesiveness and adhesion to an adherend at excellent levels).

Adhesive Sheet

The curable composition according to the present invention, when used as an adhesive composition, can give an adhesive sheet 1 according to the present invention. The adhesive sheet 1 includes a substrate and an adhesive layer disposed on or over at least one side of the substrate, where the adhesive layer is derived from the curable composition according to the present invention. This adhesive layer is also referred to as an "adhesive layer according to the present invention". The adhesive sheet 1 according to the present invention may be obtained typically, but non-limitingly, by applying the curable composition according to the present invention to the substrate, and, as needed, drying the applied layer. The application may be performed by any technique not limited and may be performed by a well-known, common method. The drying can also be performed by any method under any conditions not limited, and may be performed by a well-known, common method under conditions which may be set so as to remove volatile components such as solvents, as much as possible. In particular, assume that the curable composition according to the present invention contains a polymerization initiator giving a composition having a thermal curing time of 3.5 minutes or longer at 130° C., where the composition results from adding 1 part by weight of the polymerization initiator to 100 parts by weight of CELLOXIDE 2021P (supplied by Daicel Corporation). This curable composition can rapidly form an adhesive layer by heating/drying to remove volatile components such as solvents therefrom while restraining the curing reaction from proceeding. The resulting adhesive layer has characteristic properties as follows. At temperatures lower than 50° C., the adhesive layer offers approximately no adhesiveness. Upon heating at such a temperature as to less damage electronic components such as semiconductor chips, the adhesive layer develops adhesiveness and is rapidly cured after the heating.

The adhesive sheet 1 according to the present invention may be a single-sided adhesive sheet, which includes a substrate and an adhesive layer on or over only one side of the substrate; or a double-sided adhesive sheet, which includes a substrate and adhesive layers on or over both sides of the substrate. In the case that the adhesive sheet 1 according to the present invention is a double-sided adhesive sheet, the adhesive sheet has only to include an adhesive layer according to the present invention as at least one of two adhesive layers; and the other adhesive layer may be an adhesive layer according to the present invention, or an adhesive layer (other adhesive layer) other than the adhesive layer according to the present invention.

In another embodiment, the compound (A) and the polyorganosilsesquioxane for use in the present invention, when used, can give an adhesive sheet that has cracking resistance, heat resistance, and adhesiveness and adhesion to an adherend at excellent levels, as described above. Specifically, the adhesive sheet just mentioned above includes a substrate, an anchor coat layer, and an adhesive layer. The anchor coat layer is disposed on or over at least one side of the substrate and contains the compound (A). The adhesive layer is disposed on (on the surface of) the anchor coat layer and is derived from a curable composition containing the polyorganosilsesquioxane for use in the present invention. This adhesive sheet is also referred to as an "adhesive sheet 2 according to the present invention". The adhesive sheet 2 according to the present invention has cracking resistance, heat resistance, and adhesiveness and adhesion to an adherend at excellent levels. In the description, the adhesive sheet 1 according to the present invention and the adhesive sheet 2 according to the present invention are also generically referred to as an "adhesive sheet according to the present invention".

The adhesive sheet 2 according to the present invention may be produced typically by a production method including the steps of forming an anchor coat layer on or over at least one side of a substrate using a composition containing the compound (A); and forming an adhesive layer on the anchor coat layer using a curable composition containing the polyorganosilsesquioxane for use in the present invention. The composition containing the compound (A) is hereinafter also referred to as an "anchor-coat agent". Techniques for use herein to apply the anchor-coat agent and the curable composition are not limited and may be selected from well-known, common method. Drying to form the anchor coat layer and the adhesive layer may be performed by any method under any conditions not limited, and may be performed by a well-known, common method under such conditions as to be able to remove volatile components, such as solvents, as much as possible. The anchor-coat agent and the curable composition may each further include one or more components that have been exemplified and described as other components which the curable composition according to the present invention may include, such as the solvents and the additives.

The content (proportion) of the compound (A) in the anchor coat layer is not limited, but preferably 90 weight percent or more (e.g., 90 to 100 weight percent), and more preferably 95 weight percent or more, of the weight (100 weight percent) of the anchor coat layer.

The above-mentioned adhesive layer (namely, the adhesive layer of the adhesive sheet 2 according to the present invention) is not limited, as long as being an adhesive layer derived from a curable composition (adhesive composition) containing the polyorganosilsesquioxane for use in the present invention. The adhesive layer may be the adhesive layer according to the present invention, or another adhesive layer (adhesive layer other than the adhesive layer according to the present invention). A non-limiting example of the adhesive composition to form the other adhesive layer is a composition resulting from removing the compound (A) from the first curable composition according to the present invention.

The content (proportion) of the polyorganosilsesquioxane for use in the present invention in the above-mentioned curable composition (namely, the curable composition to form the adhesive layer of the adhesive sheet 2 according to the present invention) is not limited, but preferably 70 weight percent or more (e.g., 70 to 100 weight percent), more preferably 80 weight percent or more, and furthermore preferably 90 weight percent or more, of the total amount (100 weight percent) of the curable composition excluding solvent. The curable composition, when containing the polyorganosilsesquioxane for use in the present invention in a content of 70 weight percent or more, tends to allow the adhesive sheet to have still better heat resistance.

The adhesive sheet 2 according to the present invention may be a single-sided adhesive sheet, which includes a substrate and an adhesive layer disposed over only one side of the substrate; or a double-sided adhesive sheet, which includes a substrate and adhesive layers disposed over both sides of the substrate. In the case that the adhesive sheet 2 according to the present invention is a double-sided adhesive sheet, the adhesive sheet in this case has only to include the anchor coat layer and the adhesive layer on or over at least one side of the substrate and may include the anchor coat layer on or over the other side of the substrate, or not. The adhesive layer disposed over the other side of the substrate may be an adhesive layer derived from a curable composition (adhesive composition) containing the polyorganosilsesquioxane for use in the present invention, or an adhesive layer derived from an adhesive composition devoid of the polyorganosilsesquioxanes for use in the present invention.

Examples of the form (shape) of the adhesive sheet according to the present invention include not only a sheet form, but also forms analogous to the sheet form, such as film-like, tape-like, and plate-like forms.

The substrate in the adhesive sheet according to the present invention may be selected from well-known, common substrates (substrates or bases for use in adhesive sheets), are not limited, but are exemplified typically by plastic substrates, metal substrates, ceramic substrates, semiconductor substrates, glass substrates, paper substrates, wood substrates, and substrates having a coated surface. The substrate in the adhesive sheet according to the present invention may also be a so-called release liner. The adhesive sheet according to the present invention may include only one substrate, or two or more layers of a substrate or substrates. The thickness of the substrate is not limited, but is selectable as appropriate typically within the range of 1 to 10000 μm.

The adhesive sheet 1 according to the present invention may include each of different adhesive layers according to the present invention alone or in combination. The thickness of the adhesive layer(s) (the adhesive layer according to the present invention, the other adhesive layer) in the adhesive sheet according to the present invention is not limited, but is selectable as appropriate typically within the range of 0.1 to 10000 μm.

The adhesive sheet 2 according to the present invention may include each of different anchor coat layers alone or in combination. The thickness of the anchor coat layer(s) is not limited, but is selectable as appropriate typically within the range of 0.001 to 10000 μm.

The adhesive sheet according to the present invention may further include one or more layers, such as intermediate layers and under coats, other than the substrates, the adhesive layers, and the anchor coat layers.

Stack

The adhesive sheet according to the present invention, when used, can give a stack including the adhesive sheet according to the present invention, and an adherend layer (adherend) attached to the adhesive layer of the adhesive sheet. The stack is hereinafter also referred to as a "stack according to the present invention". The stack is a stack (integrated stacked body; laminate) that includes three or more layers (at least three layers) and includes two adherend layers (the substrate and the adherend layer), and the adhesive layer. The adhesive layer is disposed between these adherend layers and acts as a layer that bonds the adherend layers to each other. For example, in the case that the adhesive sheet according to the present invention is a single-sided adhesive sheet, the stack according to the present invention may be obtained typically by applying the adhesive sheet according to the present invention to an adherend layer, and subsequently performing a heat treatment to cure the adhesive layer in the adhesive sheet. In the resulting stack in this case, the substrate in the adhesive sheet according to the present invention corresponds to another adherend layer. Further for example, in the case that the adhesive sheet according to the present invention is a double-sided adhesive sheet and includes an adhesive layer and release liners disposed on both sides of the adhesive layer, where the release liners act as substrates (carriers), the stack according to the present invention may be obtained typically by removing one of the release liners from the adhesive sheet according to the present invention to expose one adhesive layer, applying the exposed adhesive layer (adhesive face) to an adherend layer, subsequently removing the other release liner to expose the other adhesive layer, applying the exposed other adhesive layer (adhesive face) to another adherend layer, and subjecting the resulting article to a heat treatment to cure the adhesive layers. However, the method for producing the stack according to the present invention is not limited to these methods. In the case that the adhesive sheet according to the present invention in the stack according to the present invention is an adhesive sheet 1 according to the present invention, the adhesive layer present between two adherend layers is an adhesive layer according to the present invention. In contrast, in the case that the adhesive sheet according to the present invention in the stack according to the present invention is an adhesive sheet 2 according to the present invention, an adherend layer is disposed on (laminated on) an adhesive layer derived from a curable composition (adhesive composition) containing the polyorganosilsesquioxane for use in the present invention, where the anchor coat layer lies under the adhesive layer.

The adherend layers in the stack according to the present invention are not limited, and are exemplified as with the substrate in the adhesive sheet. The stack according to the present invention may include only two adherend layers, or three or more adherend layers. The thicknesses of the adherend layers are not limited and are each selectable as appropriate typically within the range of 1 to 100000 μm. The adherend layers do not have to be in a layer form according to the strict definition.

The stack according to the present invention may include each of different adhesive layers alone or in combination, where the adhesive layers are selected from the adhesive layers according to the present invention, and the adhesive layers in the adhesive sheet 2 according to the present invention. The thickness of the adhesive layer(s) is not limited, but is selectable as appropriate typically within the range of 0.1 to 10000 μm.

The stack according to the present invention may further include one or more layers other than the adherend layers and the adhesive layers. Non-limiting examples of the other layers include intermediate layers, under coats, and other bonding layers.

Specifically, non-limiting examples of the stack according to the present invention include semiconductor chips and wafers.

The stacks according to the present invention include the adhesive layer(s) that excels not only in adhesiveness and adhesion to an adherend, but also in cracking resistance and heat resistance. For example, when the stacks according to the present invention are three-dimensional stacked semiconductor chips, the semiconductor chips are more highly integrated and less consume power as compared with conventional semiconductors, and can provide electronic devices that have higher packaging densities and still have high performance. In particular, cracking and/or separation (or delamination) of the bonding layers in the stacks may cause wiring (or interconnection) failure in the stacks during their production, or in products such as semiconductor chips and wafers produced using the stacks. This results in failure or breakdown of the stacks, or of devices including the stacks. Under these circumstances, adhesives having adhesiveness and adhesion to an adherend, heat resistance, and cracking resistance at high levels are very important as materials to constitute the stacks. The stacks according to the present invention therefore have high reliability.

The stacks according to the present invention (such as semiconductor chips and wafers), when used, can give highly integrated devices such as microprocessors, semiconductor memories, power-source ICs, communication ICs, semiconductor sensors, MEMSs, and semiconductors (semiconductor devices) each including two or more of these devices in combination. These semiconductors are used in devices or apparatuses such as high-performance devices such as servers, workstations, on-vehicle computers, personal computers, telecommunication devices, photographing or shooting devices, and image display devices. Specifically, the devices each include the stack according to the present invention.

EXAMPLES

The present invention will be illustrated in further detail with reference to several examples below. It should be noted, however, that the examples are by no means intended to limit the scope of the present invention. Molecular weights of products were measured at 40° C. using Alliance HPLC System 2695 (supplied by Waters Corporation), Refractive Index Detector 2414 (supplied by Waters Corporation), two Tskgel GMH$_{HR}$-M columns (supplied by Tosoh Corporation) as columns, Tskgel guard column H$_{HR}$L (supplied by Tosoh Corporation) as a guard column, COLUMN HEATER U-620 (supplied by Sugai) as a column oven, and THF as a solvent. Ratios of T3 species to T2 species (T3 to T2 ratios) of the products were determined by $^{29}$Si-NMR spectrum measurement using JEOL ECA 500 (500 MHz).

Preparation Example 1

In a nitrogen stream, 161.5 mmol (39.79 g) of 2-(3,4-epoxycyclohexyl)ethyltrimethoxysilane, 9 mmol (1.69 g) of phenyltrimethoxysilane, and 165.9 g of acetone were placed in a 300-mL flask (reactor) equipped with a thermometer, a stirrer, a reflux condenser, and a nitrogen inlet tube, followed by temperature rise to 50° C. To the mixture, 4.70 g (1.7 mmol in terms of potassium carbonate) of a 5% aqueous potassium carbonate solution were added dropwise over 5 minutes, and 1700 mmol (30.60 g) of water were further added dropwise over 20 minutes. Significant temperature rise did not occur during the dropwise additions. The resulting mixture was subjected to polycondensation in a nitrogen stream for 4 hours while the temperature was held at 50° C.

A product in a reaction solution after the polycondensation reaction was analyzed to find to have a number-average molecular weight of 1911 and a molecular-weight dispersity of 1.47. The product had a ratio of T3 species to T2 species (T3 to T2 ratio) of 10.3, where the T3 to T2 ratio was calculated on the basis of the $^{29}$Si-NMR spectrum of the product.

The reaction solution was then cooled, rinsed until a lower-layer liquid became neutral, from which an upper-layer liquid was isolated, followed by distilling off of the solvent at 50° C. and 1 mmHg, to a solvent content of 25 weight percent. This gave a colorless, transparent liquid resin (75 weight percent solution of an epoxy-containing polyorganosilsesquioxane (1)).

Example 1

Preparation of Anchor-coat Agent

Three (3) parts by weight of 8-glycidoxyoctyltrimethoxysilane (trade name KBM-4803, supplied by Shin-Etsu Chemical Co., Ltd.) and 7 parts by weight of propylene glycol monomethyl ether acetate were mixed and yielded an anchor-coat agent (1).

Preparation of Adhesive Composition

An adhesive composition (1) was prepared by mixing 100 parts by weight of a 75 weight percent solution of the epoxy-containing polyorganosilsesquioxane (1) prepared in Preparation Example 1 with 0.375 part by weight (in terms of solids content) of an antimony-containing sulfonium salt, and 50 parts by weight of propylene glycol monomethyl ether acetate. The antimony-containing sulfonium salt is a product under the trade name San-Aid SI-150L, supplied by SANSHIN CHEMICAL INDUSTRY CO., LTD., giving a composition having a thermal curing time of 5.4 minutes at 130° C., where the composition results from adding 1 part by weight of San-Aid SI-150L to 100 parts by weight of CELLOXIDE 2021P (supplied by Daicel Corporation).

Production of Adhesive Sheet

The anchor-coat agent (1) was applied onto one side of a silicon wafer (4-inch, supplied by SUMCO CORPORATION) by spin coating and heated at 150° C. for 5 minutes to form an anchor coat layer. Next, the adhesive composition (1) was applied onto the anchor coat layer by spin coating, heated at 80° C. for 4 minutes and subsequently heated at 100° C. for 2 minutes to remove the solvent to thereby form an adhesive layer (5 μm thick). This gave an adhesive sheet (1) including the silicon wafer, the anchor coat layer, and the adhesive layer disposed in this sequence.

Production of Stack

The anchor-coat agent (1) was applied to one side of a glass plate (4-inch, supplied by SCHOTT Nippon K.K.) by spin coating and heated at 150° C. for 5 minutes to form an anchor coat layer. Next, the adhesive composition (1) was applied onto the anchor coat layer by spin coating, and heated at 80° C. for 4 minutes and further heated at 100° C. for 2 minutes to remove the solvent to thereby form an adhesive layer (5 μm thick). This gave a glass plate with adhesive layer. This article included the glass plate, the anchor coat layer, and the adhesive layer disposed in this sequence.

The anchor-coat agent (1) was applied to one side of another glass plate (4-inch, supplied by SCHOTT Nippon K.K.) by spin coating, heated at 150° C. for 5 minutes to form an anchor coat layer, and yielded a glass plate with anchor coat layer. This article included the glass plate and the anchor coat layer disposed on the glass plate.

Under reduced pressure, the anchor coat layer surface of the glass plate with anchor coat layer was aligned with (superimposed on) the adhesive layer surface of the glass plate with adhesive layer, followed by lamination under a load of 200 g/cm² with heating at 60° C. The resulting article was heated at 150° C. for 30 minutes, then heated at 170° C. for 30 minutes, and yielded a stack (1) including the glass plate, the anchor coat layer, the adhesive layer, the anchor coat layer, and the glass plate disposed in this sequence.

Example 2

Preparation of Adhesive Composition

An adhesive composition (2) was prepared by mixing 100 parts by weight of a 75 weight percent solution of the epoxy-containing polyorganosilsesquioxane (1) prepared in Preparation Example 1 with 2.25 parts by weight of 8-glycidoxyoctyltrimethoxysilane (trade name KBM-4803, supplied by Shin-Etsu Chemical Co., Ltd.), 0.375 part by weight (in terms of solids content) of an antimony-containing sulfonium salt, and 50 parts by weight of propylene glycol monomethyl ether acetate. The antimony-containing sulfonium salt is a product under the trade name San-Aid SI-150L, supplied by SANSHIN CHEMICAL INDUSTRY CO., LTD., giving a composition having a thermal curing time of 5.4 minutes at 130° C., where the composition results from adding 1 part by weight of San-Aid SI-150L to 100 parts by weight of CELLOXIDE 2021P (supplied by Daicel Corporation).

Production of Adhesive Sheet

The adhesive composition (2) was applied to one side of a silicon wafer (4-inch, supplied by SUMCO CORPORATION) by spin coating, heated at 80° C. for 4 minutes, and subsequently heated at 100° C. for 2 minutes to remove the solvent to thereby form an adhesive layer. This gave an adhesive sheet (2) including the silicon wafer and, disposed thereon, the adhesive layer containing an epoxy-containing silane compound.

Production of Stack

The adhesive composition (2) was applied to one side of a glass plate (4-inch, supplied by SCHOTT Nippon K.K.) by spin coating, heated at 80° C. for 4 minutes, and subsequently heated at 100° C. for 2 minutes to remove the solvent to thereby form an adhesive layer (5 μm thick). This gave a glass plate with adhesive layer. This article included the glass plate and, disposed thereon, the adhesive layer containing an epoxy-containing silane compound.

The anchor-coat agent (1) was applied to one side of another glass plate (4-inch, supplied by SCHOTT Nippon K.K.) by spin coating, heated at 150° C. for 5 minutes to form an anchor coat layer, and yielded a glass plate with anchor coat layer. This article included the glass plate and the anchor coat layer disposed on the glass plate.

Under reduced pressure, the anchor coat layer surface of the glass plate with anchor coat layer was aligned with (superimposed on) the surface of the adhesive layer containing an epoxy-containing silane compound of the glass plate with adhesive layer containing an epoxy-containing silane compound, followed by lamination under a load of 200 g/cm² with heating at 60° C. The resulting article was heated at 150° C. for 30 minutes, subsequently heated at 170° C. for 30 minutes, and yielded a stack (2) including the glass plate, the anchor coat layer, the adhesive layer containing an epoxy-containing silane compound, and the glass plate disposed in this sequence.

Comparative Example 1

Preparation of Anchor-Coating Agent

An anchor-coat agent (2) was prepared by mixing 3 parts by weight of 3-glycidoxypropyltriethoxysilane (trade name KBE-403, supplied by Shin-Etsu Chemical Co., Ltd.) with 7 parts by weight of propylene glycol monomethyl ether acetate.

Preparation of Adhesive Composition

An adhesive composition (3) was prepared by mixing 100 parts by weight of a 75 weight percent solution of the epoxy-containing polyorganosilsesquioxane (1) prepared in Preparation Example 1 with 2.25 parts by weight of 3-glycidoxypropyltriethoxysilane (trade name KBE-403, supplied by Shin-Etsu Chemical Co., Ltd.), 0.375 part by weight (in terms of solids content) of an antimony-containing sulfonium salt, and 50 parts by weight of propylene glycol monomethyl ether acetate. The antimony-containing sulfonium salt is a product under the trade name San-Aid SI-150L, supplied by SANSHIN CHEMICAL INDUSTRY CO., LTD., giving a composition having a thermal curing time of 5.4 minutes at 130° C., where the composition results from adding 1 part by weight of San-Aid SI-150L to 100 parts by weight of CELLOXIDE 2021P (supplied by Daicel Corporation).

Production of Adhesive Sheet

An adhesive sheet (3) was prepared by a procedure similar to that in Example 1, except for using the anchor-coat agent (2) instead of the anchor-coat agent (1), and using the adhesive composition (3) instead of the adhesive composition (1). The adhesive sheet (3) included the silicon wafer, an anchor coat layer, and an adhesive layer containing an epoxy-containing silane compound disposed in this sequence.

Production of Stack

A stack (3) was produced by a procedure similar to that in Example 1, except for using the anchor-coat agent (2) instead of the anchor-coat agent (1) and using the adhesive composition (3) instead of the adhesive composition (1). The stack (3) included the glass plate, an anchor coat layer, the adhesive layer containing an epoxy-containing silane compound, an anchor coat layer, and the glass plate disposed in this sequence.

Comparative Example 2

Production of Adhesive Sheet

An adhesive sheet (4) was produced by a procedure similar to that in Example 2, except for using the adhesive composition (3) instead of the adhesive composition (2). The adhesive sheet (4) included the silicon wafer and an adhesive layer containing an epoxy-containing silane compound and being disposed on the silicon wafer.

Production of Stack

A stack (4) was produced by a procedure similar to that in Example 2, except for using the anchor-coat agent (2) instead of the anchor-coat agent (1), and using the adhesive composition (3) instead of the adhesive composition (2). The stack (4) included the glass plate, an anchor coat layer, an adhesive layer containing an epoxy-containing silane compound, and the glass plate disposed in this sequence.

Comparative Example 3

Production of Adhesive Sheet

An adhesive sheet (5) was produced by a procedure similar to that in Example 2, except for using the adhesive composition (1) instead of the adhesive composition (2). The adhesive sheet (5) included the silicon wafer and an adhesive layer disposed on the silicon wafer.

Production of Stack

A stack (5) was produced by a procedure similar to that in Example 2, except for not providing the anchor coat layer, and using the adhesive composition (1) instead of the adhesive composition (2). The stack (5) included the glass plate, an adhesive layer, and the glass plate disposed in this sequence.

The adhesive sheets and stacks obtained in the examples and comparative examples were evaluated in the following manner.

(1) Heat Resistance

The adhesive compositions obtained in the examples and comparative examples were heated at 150° C. for 30 minutes, subsequently heated at 170° C. for 30 minutes, and yielded cured products of adhesive layers. The cured products were subjected to thermogravimetry using a thermal analyzer (trade name TG-DTA 6300, supplied by Seiko Instruments Inc.) to measure heat decomposition temperatures. The term "heat decomposition temperature" refers to a temperature at which two tangent lines intersect with each other, as illustrated in FIG. 1, where one of the two tangent lines is a tangent line of the curve in a region with no or gradual weight loss (the region "A" in the figure) in early stages of heating, and the other is a tangent line of the inflection point of the curve in a region with abrupt weight loss (the region "B" in the figure). The samples were evaluated for heat resistance according to the following criteria. The results are given in "Heat resistance" in Table 1.

Good: having a decomposition temperature of 260° C. or higher; and

Poor: having a decomposition temperature of lower than 260° C.

(2) Adhesion

The adhesive sheets obtained in the examples and comparative examples were heated at 150° C. for 30 minutes, and subsequently heated at 170° C. for 30 minutes to cure the adhesive layers. The resulting cured products of the adhesive layers were subjected to cross-cut tests (in accordance with JIS K 5400-8.5) to evaluate adhesion to a glass plate. The adhesion was evaluated according to the following criteria. The results are given in "Adhesion" in Table 1.

Good: no separation of the adhesive layer from the silicon wafer was observed; and Poor: separation of the adhesive layer from the silicon wafer was observed.

(3) Adhesiveness

A razor blade (trade name Single-edged Razor Blade for Trimming, supplied by Nisshin EM Co., Ltd.) was inserted into the adhesive interfaces of the stacks obtained in the examples and comparative examples, and the adhesive interfaces of the stacks were observed to evaluate adhesiveness according to criteria as follows. The results are given in "Adhesiveness" in Table 1. For the stacks obtained in Example 2 and Comparative Example 2, the evaluation was performed on the adhesive interface of the side bearing the anchor coat layer.

Good: no delamination occurred at the interface; and
Poor: delamination occurred at the interface.

(4) Cracking Resistance

The adhesive sheets obtained in the examples and comparative examples were heated at 150° C. for 30 minutes and subsequently heated at 170° C. for 30 minutes to cure the adhesive layers. Cold thermal shocks were applied to the adhesive layers after curing, whether cracking occurred was examined, and the cracking resistance was evaluated according to the following criteria. The cracking resistance was evaluated on samples to which a cold thermal shock was applied by heating at 200° C. for 30 minutes and subsequently rapidly cooling down to room temperature; and on samples to which a cold thermal shock was applied by heating at 250° C. for 30 minutes and subsequently rapidly cooling down to room temperature. The results are given respectively in "Cracking resistance (200° C.)" and in "Cracking resistance (250° C.)" in Table 1.

Good: no cracking was observed in the adhesive layer; and

Poor: cracking occurred in the adhesive layer.

TABLE 1

|  | Heat resistance | Adhesion | Adhesiveness | Cracking resistance (200° C.) | Cracking resistance (250° C.) |
|---|---|---|---|---|---|
| Example 1 | Good | Good | Good | Good | Good |
| Example 2 | Good | Good | Good | Good | Good |
| Comparative Example 1 | Good | Good | Good | Good | Poor |
| Comparative Example 2 | Good | Good | Good | Good | Poor |
| Comparative Example 3 | Good | Poor | Poor | — | — |

Example 3

Preparation of Adhesive Composition

An adhesive composition (I) was prepared by mixing 100 parts by weight of the polyorganosilsesquioxane (1) prepared in Preparation Example 1, 50 parts by weight of propylene glycol monomethyl ether acetate, 0.45 part by weight (in terms of solids content) of an antimony-containing sulfonium salt, and 0.05 part by weight of (4-hydroxyphenyl) dimethylsulfonium methylsulfite (trade name Auxiliary for San-Aid SI series, supplied by SANSHIN CHEMICAL INDUSTRY CO., LTD.). The antimony-containing sulfonium salt is a product under the trade name SI-150L, supplied by SANSHIN CHEMICAL INDUSTRY CO., LTD., giving a composition having a thermal curing time of 5.4 minutes at 130° C., where the composition results from adding 1 part by weight of SI-150L to 100 parts by weight of CELLOXIDE 2021P (supplied by Daicel Corporation).

Production of Adhesive Layer

A silane coupling agent (trade name KBE-403, supplied by Shin-Etsu Chemical Co., Ltd.) was applied onto a silicon plate (2 cm by 5 cm in size, prepared by dicing a 100-mm diameter silicon wafer supplied by SUMCO CORPORATION) by spin coating, heated at 120° C. for 5 minutes, and yielded a silicon plate with silane coupling agent layer.

The adhesive composition (I) was applied onto the silane coupling agent layer surface of the silicon plate with silane coupling agent layer by spin coating, heated at 80° C. for 4 minutes, subsequently heated at 100° C. for 2 minutes to remove the residual solvent, and yielded a silicon plate with adhesive layer (I). This article included the adhesive layer (I), the silane coupling agent layer, and the silicon plate disposed in this sequence. The adhesive layer (I) had a thickness of 5 to 6 µm.

Production of Stack

A silane coupling agent (trade name KBE-403, supplied by Shin-Etsu Chemical Co., Ltd.) was applied onto a glass plate (4-inch, supplied by SCHOTT Nippon K.K.) by spin coating, heated at 120° C. for 5 minutes, and yielded a glass plate with silane coupling agent layer.

Under reduced pressure, the silane coupling agent layer surface of the prepared glass plate with silane coupling agent layer was aligned with (superimposed on) the adhesive layer (I) surface of the silicon plate with adhesive layer (I) produced in "Production of Adhesive Layer" (after storage at room temperature for 24 hours) and laminated under a load of 200 g/cm² with heating at 60° C. The resulting article was heated at 150° C. for 30 minutes, subsequently heated at 170° C. for 30 minutes, and yielded a stack (I) including the silicon plate, the silane coupling agent layer, a bonding layer (I), the silane coupling agent layer, and the glass plate disposed in this sequence.

The adhesive composition (I), adhesive layer (I), and stack (I) each obtained in Example 3 were evaluated in the following manner.

Heat Resistance

The adhesive composition (I) was heated at 150° C. for 30 minutes, subsequently heated at 170° C. for 30 minutes, and yielded a cured product. The cured product was subjected to thermogravimetry using a thermal analyzer (trade name TG-DTA 6300, supplied by Seiko Instruments Inc.) and was found to have a decomposition temperature (T) of 260° C. or higher and to have excellent heat resistance. The term "decomposition temperature (T)" refers to a temperature at which two tangent lines intersect with each other, as illustrated in FIG. 1, where one of the two tangent lines is a tangent line of the curve in a region with no or gradual weight loss (the region "A" in the figure) in early stages of heating, and the other is a tangent line of the inflection point of the curve in a region with abrupt weight loss (the region "B" in the figure).

Adhesion

The adhesive layer (I) in the silicon plate with adhesive layer (I) was heated at 150° C. for 30 minutes, and subsequently heated at 170° C. for 30 minutes to be cured. The resulting cured product of the adhesive layer (I) was subjected to a cross-cut test (in accordance with JIS K 5400-8.5) to evaluate adhesion to the silicon plate. As a result, no separation from the silicon plate was observed, and this demonstrated that the sample has excellent adhesion.

Adhesiveness

A razor blade (trade name Single-edged Razor Blade for Trimming, supplied by Nisshin EM Co., Ltd.) was inserted into the adhesive interface of the stack (I), but failed to cause delamination at the interface. This demonstrated that the bonding layer has excellent adhesiveness.

Example 4

Preparation of Adhesive Composition

An adhesive composition (II) was prepared by mixing 100 parts by weight of the polyorganosilsesquioxane (1) prepared in Preparation Example 1, 50 parts by weight of propylene glycol monomethyl ether acetate, 0.45 part by weight (in terms of solids content) of an antimony-containing sulfonium salt, 0.05 part by weight of (4-hydroxyphenyl) dimethylsulfonium methylsulfite (trade name Auxiliary for San-Aid SI series, supplied by SANSHIN CHEMICAL INDUSTRY CO., LTD.), and 0.5 part by weight of 3,9-bis (2,6-di-t-butyl-4-methylphenoxy)-2,4,8,10-tetraoxa-3,9-diphosphaspiro[5.5]undecane (trade name ADK STAB PEP-36, supplied by ADEKA CORPORATION). The antimony-containing sulfonium salt is a product under the trade name SI-150L, supplied by SANSHIN CHEMICAL INDUSTRY CO., LTD., giving a composition having a thermal curing time of 5.4 minutes at 130° C., where the composition results from adding 1 part by weight of SI-150L to 100 parts by weight of CELLOXIDE 2021P (supplied by Daicel Corporation).

Production of Adhesive Layer

A silicon plate with adhesive layer (II) was produced by a procedure similar to that in Example 3, except for using the adhesive composition (II) instead of the adhesive composition (I). The adhesive layer (II) had a thickness of 5 to 6 µm.

Production of Stack

A glass plate with silane coupling agent layer was prepared by a procedure similar to that in Example 3. Under reduced pressure, the silane coupling agent layer surface of the glass plate with silane coupling agent layer was aligned with (superimposed on) the adhesive layer (II) surface of the silicon plate with adhesive layer (II) produced in Production of Adhesive Layer (after storage at room temperature for 72 hours), followed by lamination under a load of 200 g/cm² with heating at 60° C. The resulting article was heated at 150° C. for 30 minutes, subsequently heated at 170° C. for 30 minutes, and yielded a stack (II) including the silicon plate, the silane coupling agent layer, a bonding layer (II), the silane coupling agent layer, and the glass plate disposed in this sequence.

The adhesive composition (II), adhesive layer (II), and stack (II) each obtained in Example 4 were evaluated in the following manner, by procedures similar to those in Example 3.

Heat Resistance

The sample had a heat decomposition temperature (T) of 260° C. or higher and was found to have excellent heat resistance.

Adhesion

The sample was not separated from the silicon plate and was verified to have excellent adhesion.

Adhesiveness

The sample did not delaminate at the interface and was verified to have excellent adhesiveness of the bonding layer.

Comparative Example 4

Preparation of Adhesive Composition

An adhesive composition (III) was prepared by mixing 100 parts by weight of the polyorganosilsesquioxane (1) prepared in Preparation Example 1, 50 parts by weight of propylene glycol monomethyl ether acetate, and 0.5 part by weight (in terms of solids content) of an antimony-containing sulfonium salt. The antimony-containing sulfonium salt is a product under the trade name SI-150L, supplied by SANSHIN CHEMICAL INDUSTRY CO., LTD., giving a composition having a thermal curing time of 5.4 minutes at 130° C., where the composition results from adding 1 part by weight of San-Aid SI-150L to 100 parts by weight of CELLOXIDE 2021P (supplied by Daicel Corporation).

Production of Adhesive Layer

A silicon plate with adhesive layer (III) was produced by a procedure similar to that in Example 3, except for using the adhesive composition (III) instead of the adhesive composition (I). The adhesive layer (III) had a thickness of 5 to 6 µm.

Production of Stack

A glass plate with silane coupling agent layer was prepared by a procedure similar to that in Example 3. Under reduced pressure, the silane coupling agent layer surface of the glass plate with silane coupling agent layer was aligned with (superimposed on) the adhesive layer (III) surface of the silicon plate with adhesive layer (III) produced in Production of Adhesive Layer (after storage at room temperature for 72 hours). These were tried to be attached to (affixed to) each other under a load of 200 g/cm² with heating at 60° C., but failed to be affixed.

INDUSTRIAL APPLICABILITY

The curable compositions according to the present invention are advantageously usable as adhesives, in particular, as thermosetting adhesives. The curable compositions, when cured, can be converted into adhesives having adhesiveness and adhesion to an adherend at excellent levels (and further, converted into adhesives having cracking resistance, heat resistance, and adhesiveness and adhesion to an adherend at excellent levels).

The invention claimed is:

1. A curable composition comprising:
a polyorganosilsesquioxane; and
one of:
(A) a compound represented by Formula (X); and
(B) a polymerization stabilizer,
Formula (X) expressed as follows:

[Chem. 1]

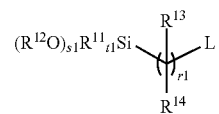
(X)

wherein r1 represents an integer from 4 to 20; L represents a group containing at least one group selected from a group consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group, the polyorganosilsesquioxane having a number-average molecular weight of 1000 to 3000 and a molecular-weight dispersity (weight-average molecular weight to number-average molecular weight ratio) of 1.0 to 3.0,
the polyorganosilsesquioxane comprising
a constitutional unit represented by Formula (1):

[Chem. 2]

$$[R^1 SiO_{3/2}] \quad (1)$$

wherein $R^1$ represents an epoxy-containing group,
the polyorganosilsesquioxane having a ratio of a constitutional unit represented by Formula (I) to a constitutional unit represented by Formula (II) of 5 or more,
Formulae (I) and (II) expressed as follows:

[Chem. 3]

$$[R^a SiO_{3/2}] \quad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,

[Chem. 4]

$$[R^b SiO_{2/2}(OR^c)] \quad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and RC is selected from hydrogen and $C_1$-$C_4$ alkyl, the polyorganosilsesquioxane having a total proportion of the constitutional unit represented by Formula (1) and a constitutional unit represented by Formula (4) of at least 55 mole percent of all siloxane constitutional units,
Formula (4) expressed as follows:

[Chem. 5]

    (4)

wherein $R^1$ is as defined in Formula (1); and $R^c$ is as defined in Formula (II).

2. The curable composition according to claim 1, wherein the polyorganosilsesquioxane further comprises a constitutional unit represented by Formula (2):

[Chem. 6]

    (2)

wherein $R^2$ is selected from substituted or unsubstituted aryl, substituted or unsubstituted aralkyl, substituted or unsubstituted cycloalkyl, substituted or unsubstituted alkyl, and substituted or unsubstituted alkenyl.

3. The curable composition according to claim 2, wherein $R^1$ is at least one group selected from a group consisting of:
groups represented by Formula (1a);
groups represented by Formula (1b);
groups represented by Formula (1c); and
groups represented by Formula (1d),
Formulae (1a), (1b), (1c), and (1d) expressed as follows:

[Chem. 7]

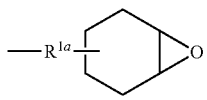    (1a)

wherein $R^{1a}$ linear or branched alkylene,

[Chem. 8]

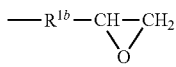    (1b)

wherein $R^{1b}$ represents linear or branched alkylene,

[Chem. 9]

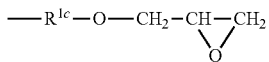    (1c)

wherein $R^{1c}$ represents linear or branched alkylene,

[Chem. 10]

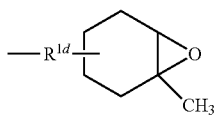    (1d)

wherein $R^{1d}$ represents linear or branched alkylene.

4. The curable composition according to claim 2, wherein the compound (A) is at least one epoxy-containing silane compound selected from a group consisting of:
compounds represented by Formula (X1); and
compounds represented by Formula (X2),
Formula (X1) is expressed as follows:

[Chem. 11]

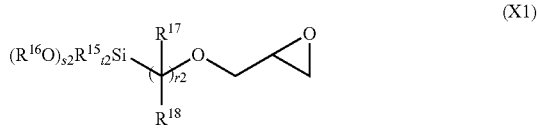    (X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group,
Formula (X2) is expressed as follows:

[Chem. 12]

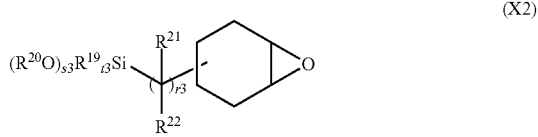    (X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

5. The curable composition according to claim 2, further comprising a polymerization initiator.

6. The curable composition according to claim 2, wherein $R^2$ is substituted or unsubstituted aryl.

7. The curable composition according to claim 6, wherein $R^1$ is at least one group selected from a group consisting of:
groups represented by Formula (1a);
groups represented by Formula (1b);
groups represented by Formula (1c); and
groups represented by Formula (1d),
Formulae (1a), (1b), (1c), and (1d) expressed as follows:

[Chem. 7]

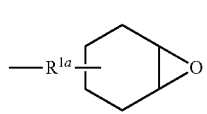    (1a)

wherein $R^{1a}$ represents linear or branched alkylene,

[Chem. 8]

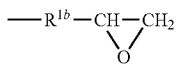

(1b)

wherein $R^{1b}$ represents linear or branched alkylene,

[Chem. 9]

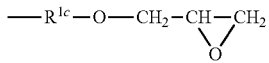

(1c)

wherein $R^{1c}$ represents linear or branched alkylene,

[Chem. 10]

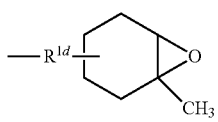

(1d)

wherein $R^{1d}$ represents linear or branched alkylene.

8. The curable composition according to claim 6,
wherein the compound (A) is at least one epoxy-containing silane compound selected from a group consisting of:
compounds represented by Formula (X1); and
compounds represented by Formula (X2),
Formula (X1) is expressed as follows:

[Chem. 11]

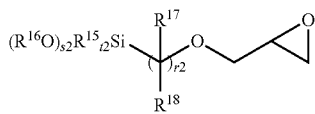

(X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group,
Formula (X2) is expressed as follows:

[Chem. 12]

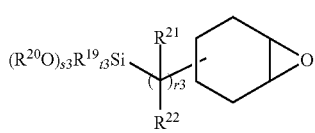

(X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

9. The curable composition according to claim 1,
wherein $R^1$ is at least one group selected from a group consisting of:
groups represented by Formula (1a);
groups represented by Formula (1b);
groups represented by Formula (1c); and
groups represented by Formula (1d),
Formulae (1a), (1b), (1c), and (1d) expressed as follows:

[Chem. 7]

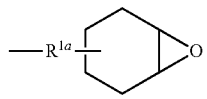

(1a)

wherein $R^{1a}$ represents linear or branched alkylene,

[Chem. 8]

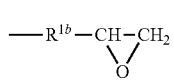

(1b)

wherein $R^{1b}$ represents linear or branched alkylene,

[Chem. 9]

(1c)

wherein $R^{1c}$ represents linear or branched alkylene,

[Chem. 10]

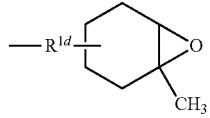

(1d)

wherein $R^{1d}$ represents linear or branched alkylene.

10. The curable composition according to claim 9,
wherein the compound (A) is at least one epoxy-containing silane compound selected from a group consisting of:
compounds represented by Formula (X1); and
compounds represented by Formula (X2), Formula (X1) is expressed as follows:

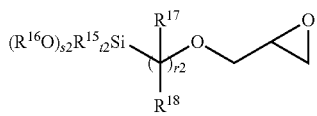
(X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group, Formula (X2) is expressed as follows:

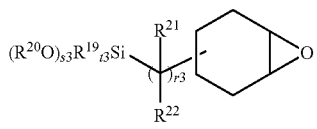
(X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

11. The curable composition according to claim 1,
wherein the compound (A) is at least one epoxy-containing silane compound selected from a group consisting of:
compounds represented by Formula (X1); and
compounds represented by Formula (X2), Formula (X1) is expressed as follows:

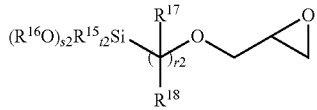
(X1)

wherein r2 represents an integer from 4 to 20; each occurrence of $R^{15}$ and $R^{16}$ independently represents an optionally substituted hydrocarbon group; s2 represents an integer from 1 to 3; t2 represents an integer from 0 to 2, where s2 plus t2 equals 3; and each occurrence of $R^{17}$ and $R^{18}$ is independently selected from hydrogen and an optionally substituted hydrocarbon group, Formula (X2) is expressed as follows:

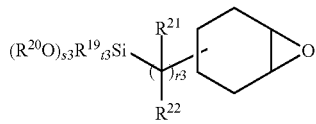
(X2)

wherein r3 represents an integer from 4 to 20; each occurrence of $R^{19}$ and $R^{20}$ independently represents an optionally substituted hydrocarbon group; s3 represents an integer from 1 to 3; t3 represents an integer from 0 to 2, where s3 plus t3 equals 3; and each occurrence of $R^{21}$ and $R^{22}$ is independently selected from hydrogen and an optionally substituted hydrocarbon group.

12. The curable composition according to claim 1, further comprising a polymerization initiator.

13. The curable composition according to claim 1,
wherein the curable composition comprises the polymerization stabilizer (B) and further comprises a silane coupling agent.

14. The curable composition according to claim 1, wherein the curable composition is an adhesive composition.

15. A cured product of the curable composition according to claim 1.

16. An adhesive sheet comprising:
a substrate; and
an adhesive layer disposed on or over at least one side of the substrate, the adhesive layer being derived from the curable composition according to claim 14.

17. A stack comprising:
the adhesive sheet according to claim 16; and
an adherend layer attached to the adhesive layer of the adhesive sheet.

18. A device comprising the stack according to claim 17.

19. An adhesive sheet comprising:
a substrate;
an anchor coat layer disposed on or over at least one side of the substrate; and
an adhesive layer disposed on the anchor coat layer,
the anchor coat layer comprising
a compound (A) represented by Formula (X):

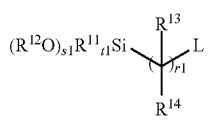
(X)

wherein r1 represents an integer from 4 to 20; L represents a group containing at least one group selected from the group consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group, wherein the adhesive layer is derived from a curable composition comprising
a polyorganosilsesquioxane,
the polyorganosilsesquioxane has a number-average molecular weight of 1000 to 3000 and a molecular-weight dispersity (weight-average molecular weight to number-average molecular weight ratio) of 1.0 to 3.0,
the polyorganosilsesquioxane comprises
a constitutional unit represented by Formula (1):

[Chem. 2]

$$[R^1SiO_{3/2}] \qquad (1)$$

wherein $R^1$ represents an epoxy-containing group, and
the polyorganosilsesquioxane has a ratio of a constitutional unit represented by Formula (I) to a constitutional unit represented by Formula (II) of 5 or more, Formula (I) is expressed as follows:

[Chem. 3]

$$[R^aSiO_{3/2}] \qquad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen, Formula (II) is expressed as follows:

[Chem. 4]

$$[R^bSiO_{2/2}(OR^c)] \qquad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and RC is selected from hydrogen and $C_1$-$C_4$ alkyl,
the polyorganosilsesquioxane has a total proportion of the constitutional unit represented by Formula (1) and a constitutional unit represented by Formula (4) of at least 55 mole percent of all siloxane constitutional units,
Formula (4) expressed as follows:

[Chem. 5]

$$[R^1SiO_{2/2}(OR^c)] \qquad (4)$$

wherein $R^1$ is as defined in Formula (1); and $R^c$ is as defined in Formula (II).

20. A method for producing the adhesive sheet according to claim 19, the method comprising the steps of:
a) forming an anchor coat layer on or over at least one side of a substrate using a composition comprising a compound (A) represented by Formula (X); and
b) forming an adhesive layer on the anchor coat layer using a curable composition comprising a polyorganosilsesquioxane, Formula (X) expressed as follows:

[Chem. 1]

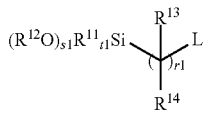

(X)

wherein r1 represents an integer from 4 to 20; L represents a group containing at least one group selected from the group consisting of epoxy, oxetanyl, and vinyl ether groups; each occurrence of $R^{11}$ and $R^{12}$ independently represents an optionally substituted hydrocarbon group; s1 represents an integer from 1 to 3; t1 represents an integer from 0 to 2, where s1 plus t1 equals 3; and each occurrence of $R^{13}$ and $R^{14}$ is independently selected from hydrogen and an optionally substituted hydrocarbon group,
the polyorganosilsesquioxane has a number-average molecular weight of 1000 to 3000 and a molecular-weight dispersity (weight-average molecular weight to number-average molecular weight ratio) of 1.0 to 3.0,
the polyorganosilsesquioxane comprises
a constitutional unit represented by Formula (1):
[Chem. 2]

$$[R^1SiO_{3/2}] \qquad (1)$$

wherein $R^1$ represents an epoxy-containing group,
the polyorganosilsesquioxane has a ratio of a constitutional unit represented by Formula (I) to a constitutional unit represented by Formula (II) of 5 or more,
Formula (I) is expressed as follows:
[Chem. 3]

$$[R^aSiO_{3/2}] \qquad (I)$$

wherein $R^a$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen,
Formula (II) is expressed as follows:
[Chem. 4]

$$[R^bSiO_{2/2}(OR^c)] \qquad (II)$$

wherein $R^b$ is selected from an epoxy-containing group, substituted or unsubstituted aryl, substituted or unsubstituted aralkyl, substituted or unsubstituted cycloalkyl, substituted or unsubstituted alkyl, substituted or unsubstituted alkenyl, and hydrogen; and RC is selected from hydrogen and $C_1$-$C_4$ alkyl,
the polyorganosilsesquioxane has a total proportion of the constitutional unit represented by Formula (1) and a constitutional unit represented by Formula (4) of at least 55 mole percent of all siloxane constitutional units,
Formula (4) expressed as follows:
[Chem. 5]

$$[R^1SiO_{2/2}(OR^c)] \qquad (4)$$

wherein $R^1$ is as defined in Formula (1); and $R^c$ is as defined in Formula (II).

* * * * *